(12) United States Patent
Weder

(10) Patent No.: US 6,444,072 B1
(45) Date of Patent: *Sep. 3, 2002

(54) PROCESS FOR PRODUCING HOLOGRAPHIC MATERIAL

(75) Inventor: Donald E. Weder, Highland, IL (US)

(73) Assignee: Southpac Trust International, Rarotonga Cook Island ( * ) Notice: Subject to any disclaimer, the term of this patent is extended or adjusted under 35 U.S.C. 154(b) by 127 days.

This patent is subject to a terminal disclaimer.

(21) Appl. No.: 09/583,417

(22) Filed: May 31, 2000

Related U.S. Application Data

(63) Continuation-in-part of application No. 09/372,526, filed on Aug. 11, 1999, now Pat. No. 6,372,073.

(51) Int. Cl.[7] .............................................. B32B 31/00
(52) U.S. Cl. ...................................... 156/209; 156/231
(58) Field of Search .............................. 159/1; 264/1.31, 264/1.34, 1.35, 1.6, 2.1; 156/209, 219, 230, 231, 232, 233, 237, 239, 240, 249, 277

(56) References Cited

U.S. PATENT DOCUMENTS

| 4,773,718 A | | 9/1988 | Weitzen et al. ............ 350/3.61 |
| 4,840,757 A | * | 6/1989 | Blenkhorn .................... 264/22 |
| 4,906,315 A | * | 3/1990 | McGrew ..................... 156/231 |
| 5,662,986 A | | 9/1997 | Stepanek .................... 428/195 |
| 5,695,808 A | | 12/1997 | Cueli ............................. 427/9 |
| 5,723,203 A | | 3/1998 | Stepanek .................... 428/195 |
| 5,727,362 A | * | 3/1998 | Weder ......................... 53/397 |
| 5,735,989 A | | 4/1998 | Stepanek .................... 156/237 |
| 5,746,865 A | | 5/1998 | Stepanek .................... 156/233 |
| 5,766,734 A | | 6/1998 | Stepanek .................... 428/195 |
| 5,871,608 A | | 2/1999 | Stepanek .................... 156/233 |
| 5,900,095 A | | 5/1999 | Stepanek .................... 156/230 |
| 5,939,177 A | | 8/1999 | Stepanek .................... 428/195 |
| 6,060,003 A | * | 5/2000 | Karszes ..................... 264/1.34 |
| 6,132,822 A | * | 10/2000 | Overcash et al. .......... 428/34.2 |

* cited by examiner

Primary Examiner—Michael W. Ball
Assistant Examiner—Gladys Piazza
(74) Attorney, Agent, or Firm—Dunlap, Codding & Rogers, P.C.

(57) ABSTRACT

Processes for producing a holographic material wherein the holographic image is formed on a polished, substantially smooth surface of a printing element and then transferred the holographic image to a substrate. A coating is applied to the smooth surface of the printing element to provide a coated surface, the coated surface is embossed or engraved to provide the holographic image, and the holographic image is then transferred to a substrate via a bonding material, thereby producing the holographic material. The holographic material may be used to provide a decorative cover for an object or item, such as a floral grouping or a potted plant.

4 Claims, 15 Drawing Sheets

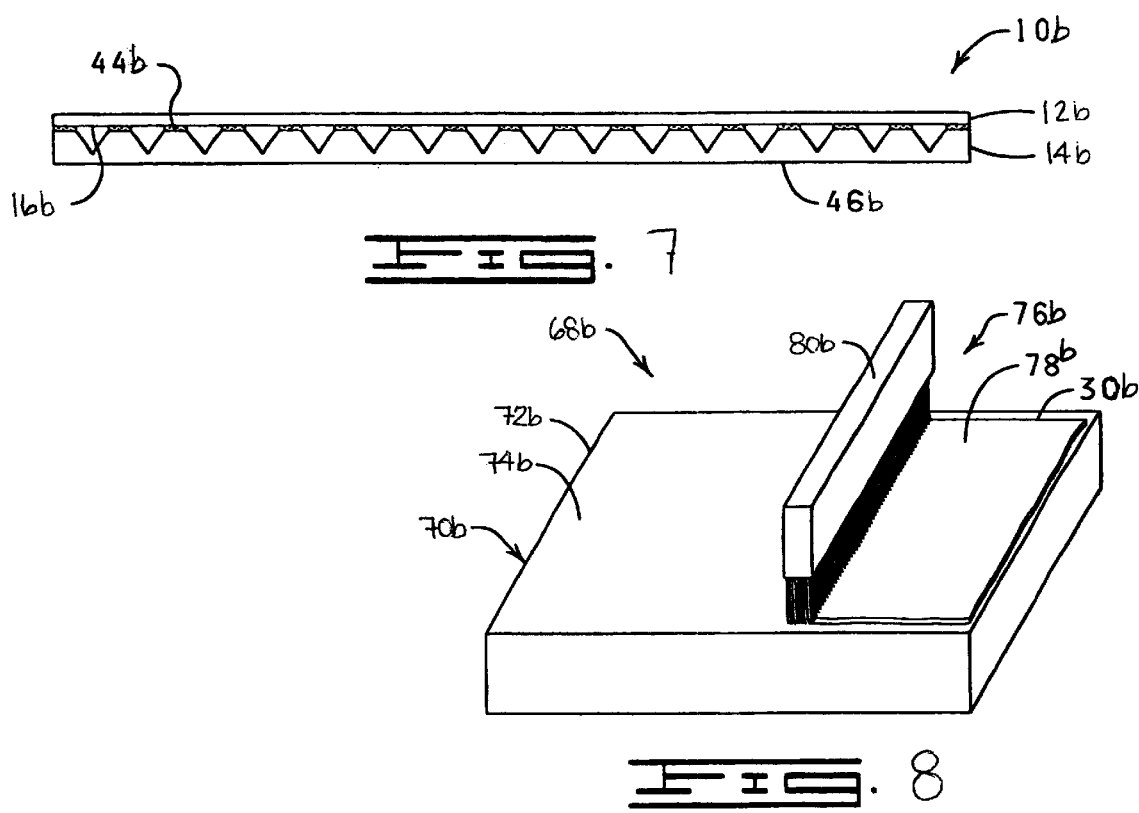

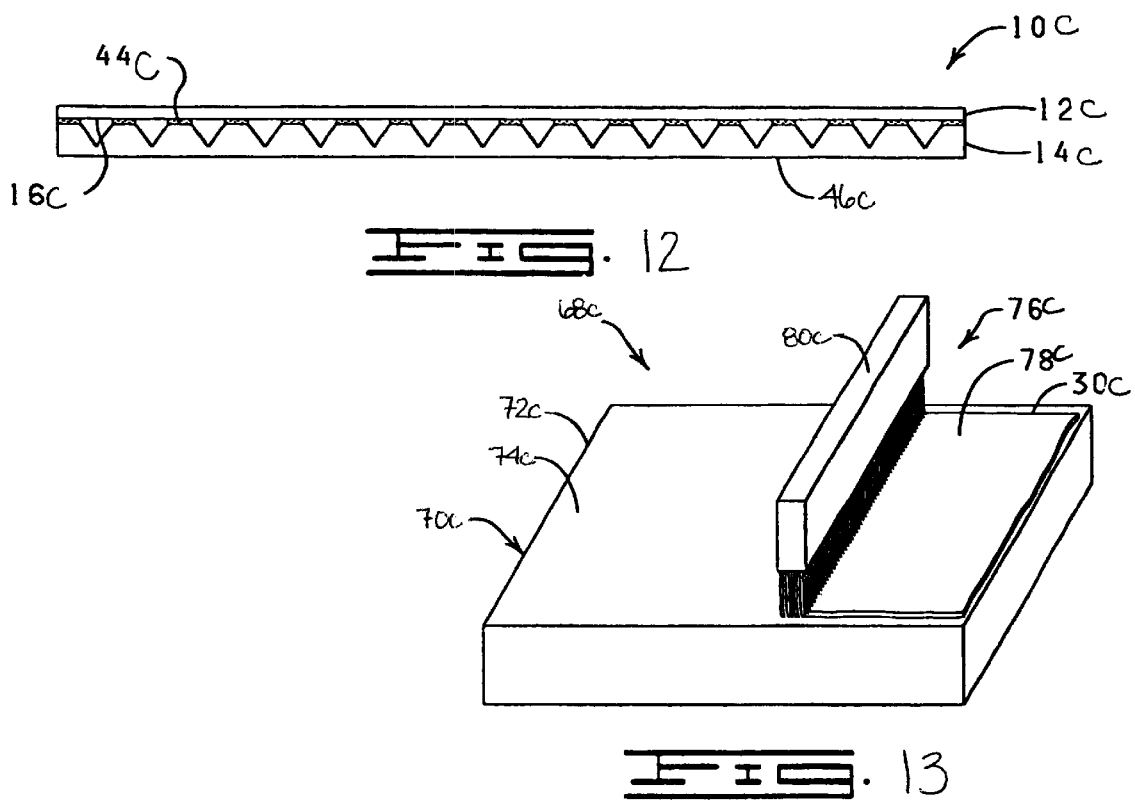

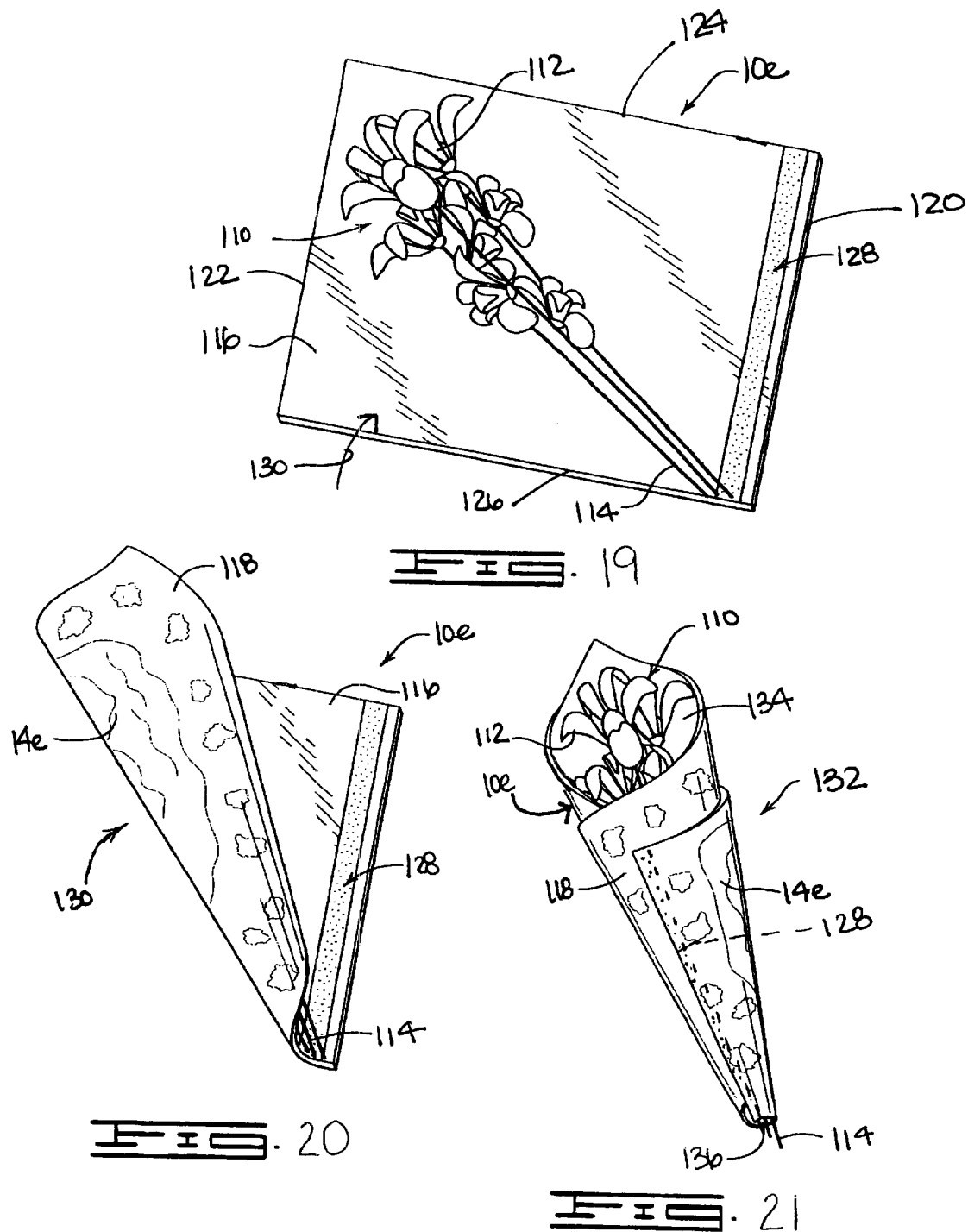

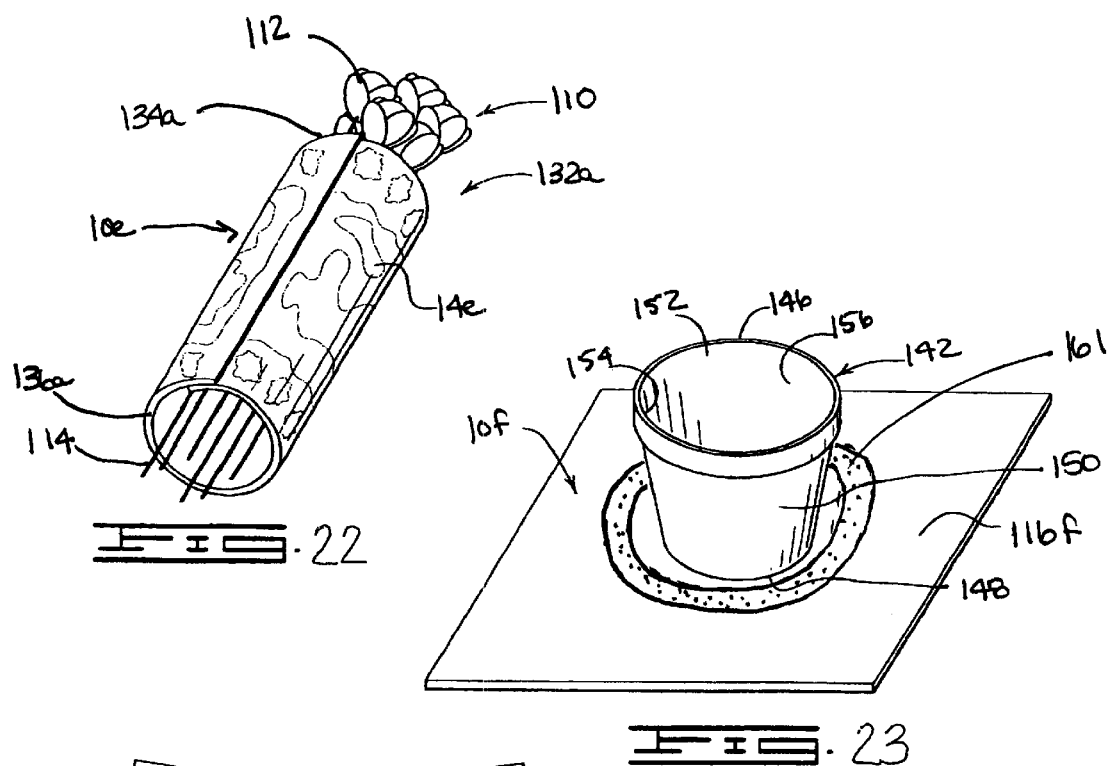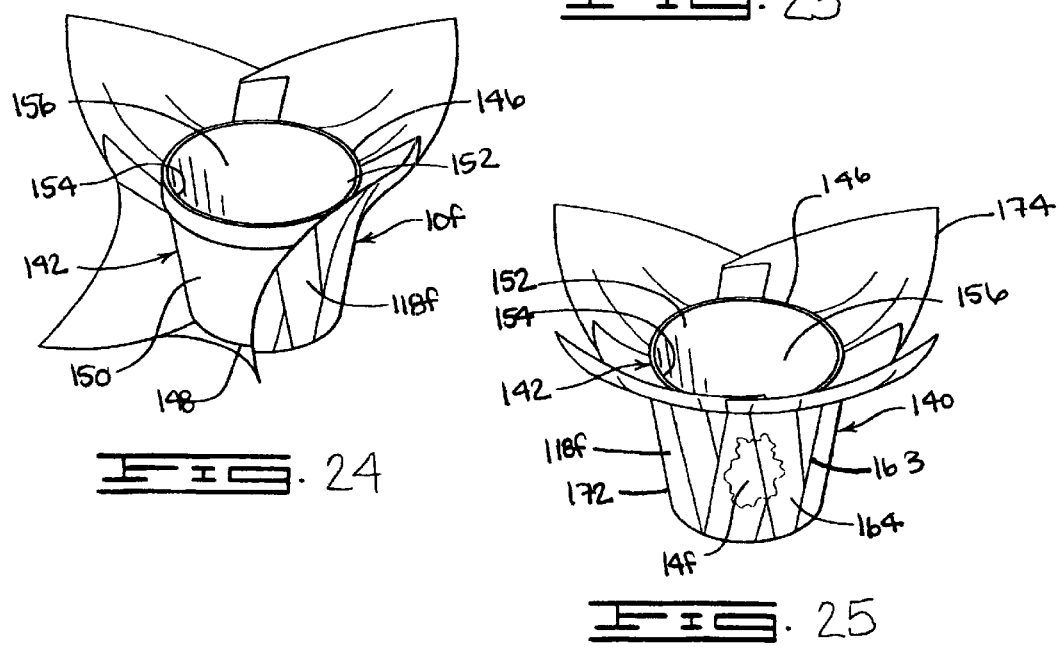

PROCESS FOR PRODUCING HOLOGRAPHIC MATERIAL

CROSS REFERENCE TO RELATED APPLICATIONS

This application is a continuation-in-part of application U.S. Ser. No. 09/372,526, filed Aug. 11, 1999, entitled "PROCESS FOR PRODUCING HOLOGRAPHIC MATERIAL, now U.S. Pat. No. 6,372,073".

STATEMENT REGARDING FEDERALLY SPONSORED RESEARCH OR DEVELOPMENT

Not applicable.

BACKGROUND OF THE INVENTION

1. Field of the Invention

The present invention relates generally to processes for producing decorative material, and more particularly, but not by way of limitation, to processes for producing holographic material, as well as methods for using same.

2. Brief Description of the Prior Art

Processes for producing holographic materials are well known in the art. One process involves passing a layer of plastic, for example, through a machine which imparts an image within the covering or upper strata of the plastic layer. A powdered metallic constituent or component (e.g. aluminum) is then applied thereon by a metallizing process. After metallizing, a holographic or 3-dimensional image is imparted on the metallized layer of plastic. This image is extremely pleasing and is widely used within the credit card and security industries since the resulting image is difficult to duplicate and thus assists in the prevention of fraud by counterfeiting, for example. However, images produced by this process can be quite expensive since the machines required for production of the images are complicated and costly in and of themselves. Additionally, holographic images produced by this process are usually small in size, and larger holographic images cannot be imprinted by this process. Thus, this process of producing holographic images has not been widely used outside of the credit card and novelty industry.

A process for producing large sheets of holographic material at a lower cost than the process described above involves producing the holographic image laminated to a polymeric support, contacting the holographic image on the polymeric support to a substrate such as tissue paper or foil via an adhesive, and delaminating the polymeric support, thereby transferring the holographic image from the polymeric support to the tissue paper or foil substrate. The image cannot be directly applied to a substrate having a rough surface because the rough surface of the substrate will refract light and will not have a highly reflective finish, thereby disrupting the holographic image.

Therefore, new and improved methods for producing holographic material requiring less time and expense are being sought. It is to such a process for producing holographic material that the present invention is directed.

SUMMARY OF THE INVENTION

According to the present invention, processes for producing holographic material are provided which avoid the disadvantages and defects of the prior art, making the processes more economically feasible. Broadly, processes are provided for transferring holographic images to a substrate to produce a holographic material. These processes involve producing the holographic image on a polished, substantially smooth surface and then transferring the holographic image to a substrate, thereby bypassing the need for the lamination/delamination steps used in the prior art.

In one aspect of the present invention, a printing element having a polished, substantially smooth surface is provided, and a metallic coating is applied to the smooth surface of the printing element to provide a coated surface. The coated surface is embossed or engraved to provide the holographic image on the coating, and the holographic image is then transferred to a substrate, thereby producing a holographic material.

In another aspect of the present invention, a non-metallic coating may be applied to the smooth surface of the printing element to provide a coated surface, which is then embossed or engraved to provide an image. The embossed or engraved coated surface may then be metallized, if necessary, to provide a holographic image on the coating, and the holographic image is transferred to a substrate to produce the holographic material.

The production of holographic materials in accordance with the present invention may be performed as a continuous process or as a batch process. Applications of the holographic materials produced in accordance with the present invention include wrapping a floral grouping and providing a decorative cover for an object such as a flower pot or a potted plant, decorative wrappings for various food and gift items, decorative and non-decorative elements, pigments, Christmas ornaments, etc.

An object of the present invention is to provide improved processes for producing holographic materials.

Another object of the present invention, while achieving the before-stated object, is to provide processes for producing holographic materials which do not suffer from the disadvantages of the prior art processes.

Other objects, features and advantages of the present invention will become apparent from the following detailed description when read in conjunction with the accompanying drawings and appended claims.

BRIEF DESCRIPTION OF THE DRAWINGS

FIG. 7 is a side elevational view illustrating a sheet of holographic material having a holographic image embossed thereon produced by a batch process in accordance with the present invention.

FIG. 8 is a diagrammatic representation of a flat plate used to produce sheets of holographic material having a holographic image embossed thereon in accordance with the present invention, the flat plate having a coating disposed on a surface thereof.

FIG. 12 is a side elevational view illustrating a sheet of holographic material having a holographic image engraved thereon produced by another batch process in accordance with the present invention.

FIG. 13 is a diagrammatic representation of a flat plate used to produce sheets of holographic material having a holographic image engraved thereon in accordance with the present invention, the flat plate having a coating disposed on a surface thereof.

FIG. 19 is a perspective view of a floral grouping disposed on a sheet of holographic material.

FIG. 20 is a perspective view of the floral grouping of FIG. 19 being wrapped in the sheet of holographic material in one method of wrapping with the sheet of holographic material.

FIG. 21 is a perspective view of the floral grouping wrapped in the sheet of holographic material in a conical fashion.

FIG. 22 is a perspective view of another method of using a sheet of holographic material to wrap a floral grouping, wherein the floral grouping is wrapped in the sheet of holographic material in a cylindrical fashion.

FIG. 23 is a perspective view of a sheet of holographic material having a flower pot disposed thereon.

FIG. 24 is a perspective view of the sheet of holographic material of FIG. 23 partially wrapped about the flower pot.

FIG. 25 is a perspective view of the sheet of holographic material of FIG. 23 wrapped about the flower pot.

DETAILED DESCRIPTION OF THE INVENTION

THE EMBODIMENTS OF FIGS. 1–6

Figure 1:
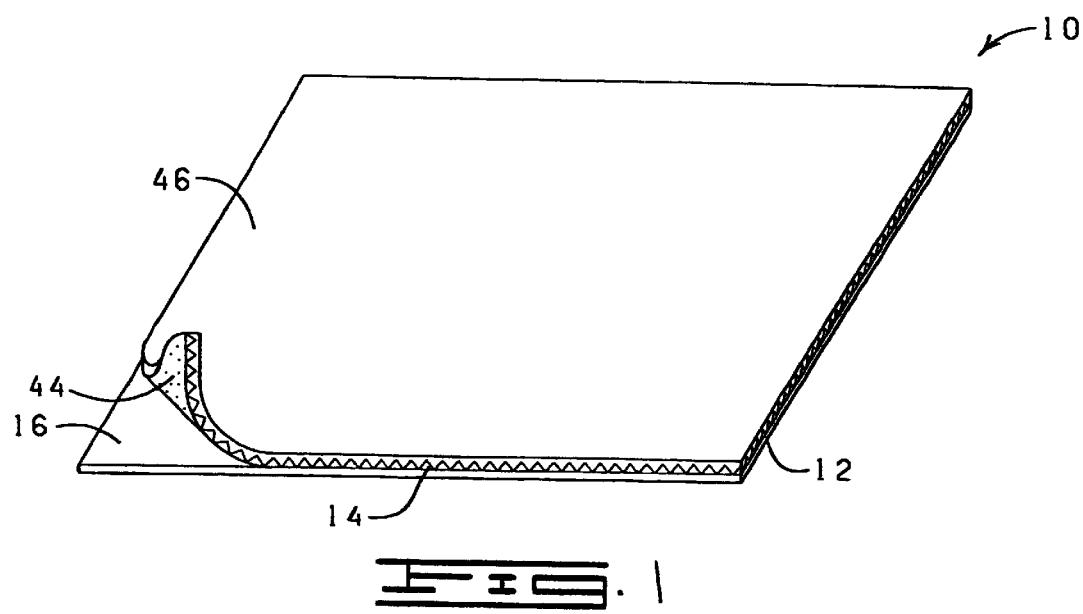
FIG. 1 is a perspective view illustrating a sheet of holographic material having a holographic image embossed thereon produced by a continuous process in accordance with the present invention.

Referring now to the drawings, shown in FIG. 1 and designated therein by the reference numeral 10 is a sheet of holographic material constructed in accordance with the present invention by a continuous process. The sheet of holographic material 10 comprises a substrate 12 having a holographic design or image 14 formed thereon. The holographic image 14 provides the sheet of holographic material 10 with a holographic or 3-dimensional appearance.

The term "holographic image" as used herein is to be understood to mean a three-dimensional image most visible from an oblique angle. The unique properties of holographic images are that they appear to float in space, are true-to-life and can change perspective, that is, permit one to look around corners and watch hidden features of the image come to light.

Further, the "holographic image" can be in any geometric form, or any combination of geometric forms, for example, squares, round spots, triangles, rectangles, octagonals, or the like, or any non-geometric, asymmetrical or fanciful forms, or any combination thereof, for example, but not by way of limitation, hearts, balloons, flowers, lace, slogans, logos, print (any combination of letters and/or numbers), signs, human forms (real and fictional), animal forms (real and fictional), cartoon characters, and/or plant forms. Such holographic images may include a color, or a portion of a color, or a combination of colors and designs. Alternatively, at least a portion of the holographic image may be colorless, translucent, transparent, opaque, pearlescent, iridescent, or the like.

The term "substrate" when used herein means a sheet of material capable of receiving the holographic image 14 and which provides stability to the holographic image 14. The substrate 12 of the sheet of holographic material 10 may be flexible or non-flexible. The substrate 12 can be constructed of any suitable material capable of receiving a holographic image, such as polymeric film, foil, paper, tissue, laminations thereof and combinations thereof. The substrate 12 includes a surface 16 which may be substantially rough and textured or substantially smooth. For example, tissue paper, kraft paper and high density polyethylene film often have rough surfaces, while foil and chromecoat paper typically have smooth surfaces.

The thickness of the substrate 12 can vary widely. Generally, however, the substrate 12 has a thickness in a range from about 0.0002 mil to about 30 mil, and more desirably from about 0.1 mil to about 20 mil.

The substrate 12 may have various printings, colorings, coatings, embossings, texturizing, flocking and/or metallic finishes, or other decorative surface ornamentation applied separately or simultaneously or may be characterized totally or partially by pearlescent, translucent, transparent, iridescent, or other finishes. Each of the above-named characteristics may occur alone or in combination, and when present in combination, such characteristics may be in or out of register with one another.

Figure 2:
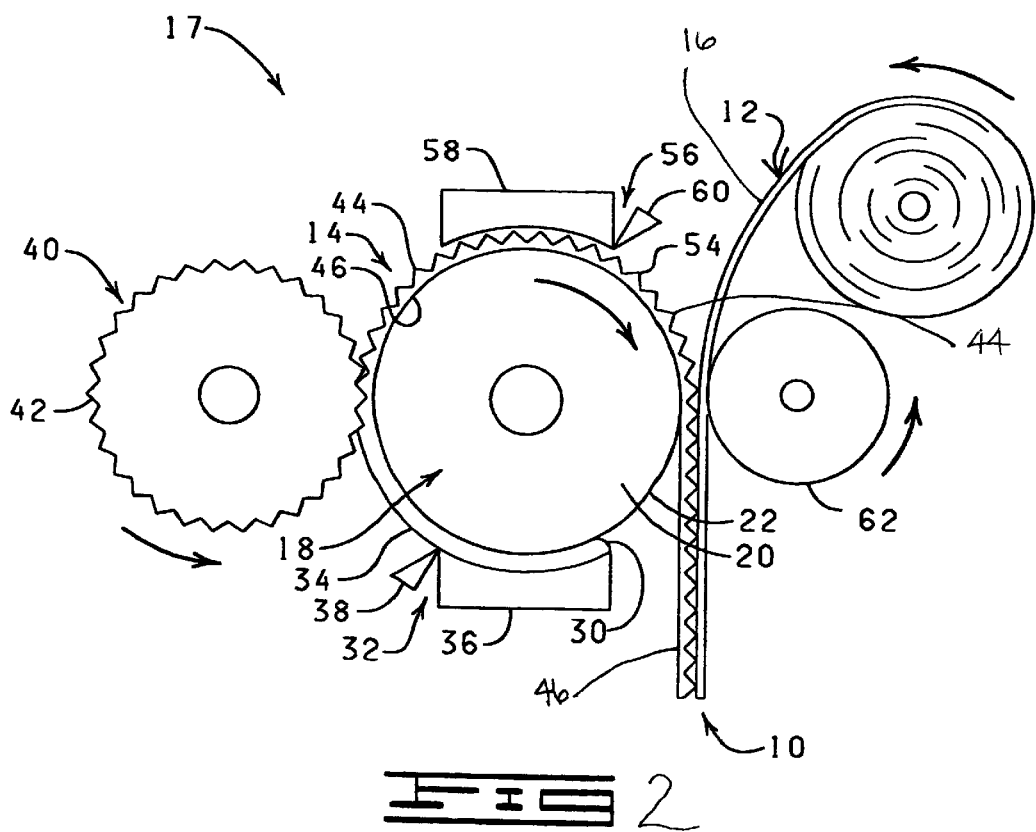
FIG. 2 is a partial schematic representation of an apparatus for producing holographic material in a continuous process, the apparatus utilizing a cylindrical drum and an embossing element.
Figure 3:
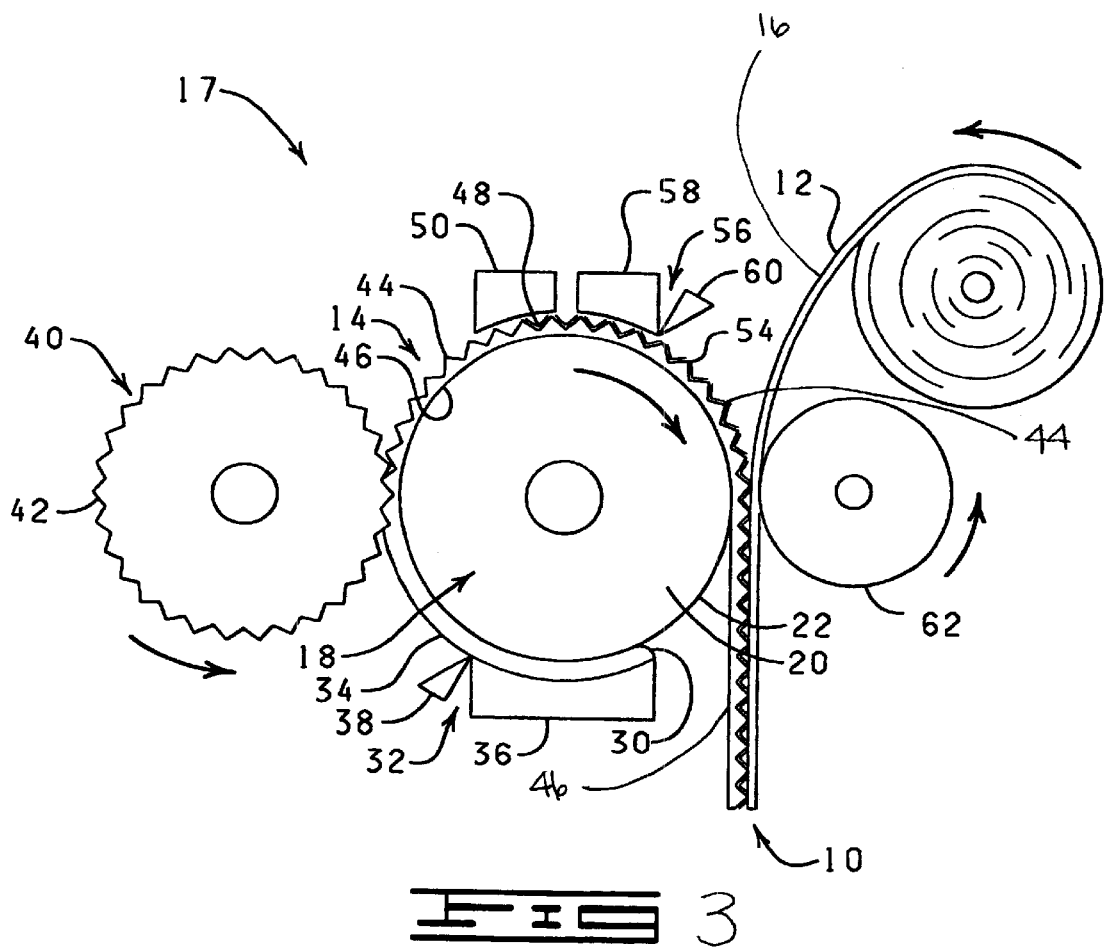
FIG. 3 is a partial schematic representation of another apparatus for producing holographic material in a continuous process, the apparatus utilizing a cylindrical drum and an embossing element.

Referring now to FIGS. 2 and 3, an apparatus 17 for continuously producing the holographic material 10 is schematically illustrated. As will be more fully described hereinafter, the holographic material 10 is produced using a printing element 18. The printing element 18 may be provided with a smooth surface or a rough surface. When the printing element 18 is provided with a smooth surface, the need to produce the holographic image on a substrate having a smooth surface, such as required by the prior art methods, is substantially eliminated.

The term "printing element" as used herein means any element having a surface capable of having a holographic image produced thereon whereby the holographic image can be transferred to a substrate without substantially distorting the holographic image. Thus, the printing element 18 for producing the holographic material 10 utilizing the apparatus 17 may be, for example, but not limited to, a cylindrical drum, a roller and the like. The printing element 18 may be constructed of any suitable material capable of having a polished, substantially smooth surface and which is capable of having the holographic image formed thereon for transfer to a desired substrate. The printing element 18 may be constructed of chrome, stainless steel, tool steel and the like. The printing element 18 may also be constructed in part of a resilient or non-resilient material such that the printing element 18 is provided with a resilient or non-resilient surface.

The printing element 18 illustrated in FIGS. 2 and 3 is a cylindrical drum 20 having a smooth surface 22. The cylindrical drum 20 permits the holographic material 10 to be continuously produced. A coating 30 capable of receiving a holographic image is applied to the smooth surface 22 of the cylindrical drum 20 by a coating assembly 32, thereby providing a coated surface 34 of the cylindrical drum 20. The coating assembly 32 is illustrated as comprising a coating pan 36 and a reverse gravure doctor blade 38. The thickness of the coating 30 on the coated surface 34 of the cylindrical drum 20 can be controlled and maintained within preselected limits by the reverse gravure doctor blade 38 of the coating assembly 32.

It will be understood that other methods of applying the coating 30 to the smooth surface 22 of the cylindrical drum 20 may be employed, such as spraying, brushing, etc.

The term "coating" as used herein is to be understood to mean a maleable film, ink or lacquer which is able to be embossed or engraved to receive a holographic image on at least a portion thereof. For example, the coating 30 may be a metallic material such as metallic polymeric film, metallic, iridescent pigment, foil, metallized lacquer and combinations thereof. The coating 30 may also be a nonmetallic material such as polymeric film, foil, lacquer and combinations thereof. The coating 30 may also consist of metallized film chopped into glitter and mixed with a lacquer to provide and ink or lacquer as the coating 30. When the coating 30 is a nonmetallic material, the process for producing the holographic material 10 in accordance with the present invention may include an additional step of metallizing the coated surface 34 of the cylindrical drum 20, which will be described in detail below. The step of metallizing the non-metallic coated surface 30 will not be required when a non-metallic material employed as the coating 30 possesses the reflective properties necessary to highlight a holographic image. Examples of non-metallic coatings 30 possessing such characteristics include iridescent pigments and inks or lacquers containing metallized film glitter.

The term "lacquer" as used herein means a coating substance consisting of resinous materials, such as cellulose esters, cellulose ethers, shellac, gum, alkyd resins and the like, which are dissolved in a solvent that evaporates rapidly on application such as ethyl alcohol, thereby leaving a tough, adherent film. Lacquers which are useful in the present invention are mixtures, such as, but not limited to, lacquers produced by mixing styrene-acrylic emulsions, such as Lucidene 603 and Lucidene 395 (Morton International, Inc., 100 North Riverside Plaza, Chicago, Ill. 60606) with a non-ionic surfactant, such as Surfynol 465 (Air Products and Chemicals, Inc., 7201 Hamilton Boulevard, Allentown, Pa. 18195-1501) and ammonia (G. S. Robbins and Company, 126 Chouteau Avenue, St. Louis, Mo. 63102). The lacquer produced as described above may also contain a wax emulsion in water, such as Liquitron 440 (Carrol Scientific, Inc., 5401 S. Dansher Road, Countryside, Ill. 60525).

The coated surface 34 of the cylindrical drum 20 is then embossed by an embossing element 40, such as an embossing drum 42. Embossing elements are used to produce materials to decorate or cover articles by depressing, carving, raising, or printing designs, patterns, etc. so that at least a portion of the design, pattern, etc. is raised above the surface of the material. Embossing elements and methods for embossing materials are well known in the art; thus, no further discussion of the embossing element 40 or embossing methods need be set forth.

Embossing of the coated surface 34 of the cylindrical drum 20 produces a holographic image 14 on the coated surface 34 of the cylindrical drum 20. The holographic image 14 is provided with a first surface 44 and a second surface 46 which is substantially adjacent the smooth surface 22 of the cylindrical drum 20.

As shown in FIG. 3, if the coating 30 used to provide the coated surface 34 of the cylindrical drum 20 is formed of a non-metallic material which does not possess reflective properties necessary to provide the holographic image 14, a metallic constituent or component 48 is applied to the embossed coated surface 34 of the cylindrical drum 20 to provide the holographic image 14. The metallic constituent or component 48 can be applied to the embossed coated surface 34 of the cylindrical drum 20 by any suitable method, such as by discharging the metallic constituent or component 48 from a reservoir 50. Metallic constituents or components which may be employed to metallize the embossed coated surface 34 of the cylindrical drum 20 are known in the art and include powdered metals such as powdered aluminum.

Once the holographic image has been produced, a bonding material 54 is applied to the first surface 44 of the holographic image 14 by a bonding material applicator 56. The bonding material applicator 56 comprises a pan 58 and a reverse gravure doctor blade 60 for removing excess bonding material 54 and controlling the thickness of the bonding material 54 so as to insure a substantially uniform coating of bonding material 54 on the first surface 44 of the holographic image 14 present on the cylindrical drum 20. The bonding material 54 applied to the first surface 44 of the holographic image 14 is contacted with the surface 16 of the substrate 12, thereby bondingly contacting the holographic image 14 to the substrate 12 and producing the holographic material 10.

The term "bonding material" when used herein may be an adhesive, such as a pressure sensitive adhesive, or a cohesive. Where the bonding material is a cohesive, a similar cohesive material must be placed on the adjacent surface for bondingly contacting and bondingly engaging with the cohesive material. The term "bonding material" may also be materials which are heat sealable and, in this instance, the adjacent portions of the materials must be brought into contact and then heat must be applied to effect the seal. The term "bonding material" when used herein also means a lacquer, which may be the coating 30 described above. In this instance, heat, sound waves, or vibrations may be applied to effect the sealing of the lacquer. In this way, the coating 30 may both receive the holographic image 14 and effect sealing of the holographic image 14 to the substrate 12, thereby producing the holographic material 10.

To bondingly secure the holographic image 14 to the substrate 12 and to transfer the holographic image 14 from the smooth surface 22 of the cylindrical drum 20 to the substrate 12, various methods may be employed. For example, heat and/or pressure may be applied to effect the seal between the holographic image 14 and the substrate 12. As shown in FIGS. 2 and 3, a nip formed by opposing rollers of the cylindrical drum 20 and a sealing drum 62 may sandwich the holographic image 14 and the substrate 12 to effect a seal between the substrate 12 and the holographic image 14. In addition, the sealing drum 62 may be a heated roller to aid in effecting the seal between the holographic image 14 and the substrate 12.

It will be understood that other methods of bondingly securing and sealing the holographic image 14 and the substrate 12 which may be employed with the apparatus 17 for continuously producing the holographic material 10 as described herein may be employed in this process, and is not limited to the method described herein.

The holographic material 10 is then removed from the smooth surface 22 of the cylindrical drum 20. Methods of removing the holographic material 10 from the cylindrical drum 20 are known in the art. The holographic material 10 produced by the continuous process 17 may be present in different forms such as a roll or sheets of holographic material 10.

Following production of the holographic material 10, the holographic material 10 may be modified by various methods, such as lamination of a transparent polymeric film thereto, as described in detail herein below.

Figure 4:
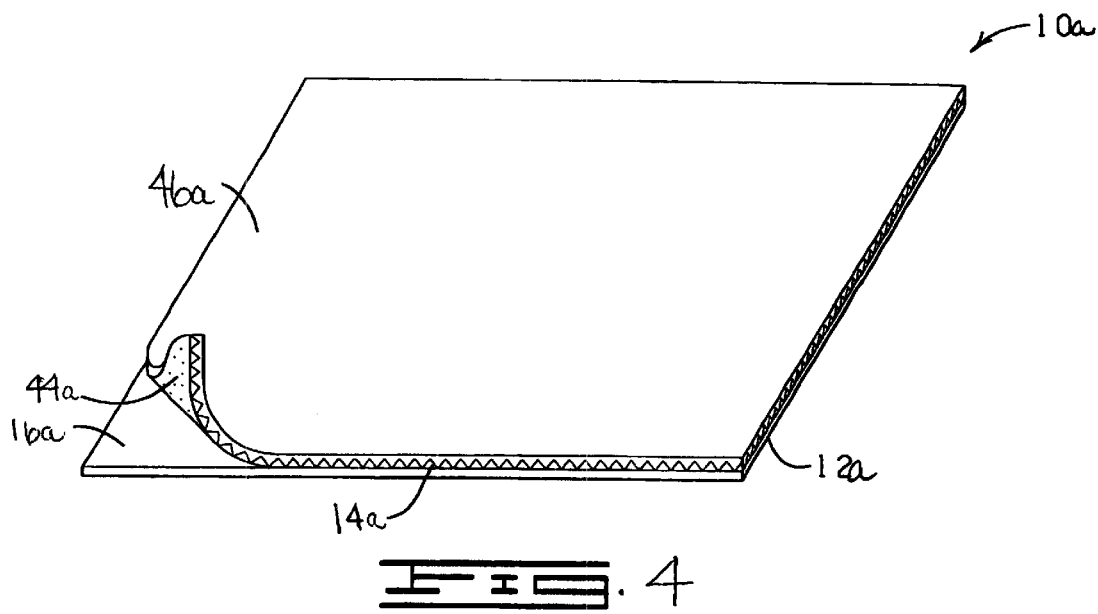
FIG. 4 is a perspective view illustrating a sheet of holographic material having a holographic image engraved thereon produced by another continuous process in accordance with the present invention.

Shown in FIG. 4 is a sheet of holographic material 10a which is similar to the sheet of holographic material 10 illustrated in FIG. 1 and described in detail hereinbefore, except that the holographic image 14a of the sheet of holographic material 10a is produced by engraving rather than embossing. The sheet of holographic material 10a comprises a substrate 12a having a surface 16a and a holographic image 14a formed thereon, the holographic image 14a having a first surface 44a and a second surface 46a wherein the first surface 44a of the holographic image 14a is bondingly connected to the surface 16a of the substrate 12a. The sheet of holographic material 10a is produced continuously utilizing an apparatus 17a which is shown in FIGS. 5 and 6 and which is substantially similar to the apparatus 17 illustrated in FIGS. 2 and 3 and described in detail previously, except that an engraving element 41a, such as a laser 43a, is employed to produce the holographic image 14a of the sheet of holographic material 10a, rather than the embossing element 40 shown in FIGS. 2 and 3.

Briefly, a coating 30a capable of receiving a holographic image is applied to a smooth surface 22a of a cylindrical drum 20a by a coating assembly 32a, thereby providing a coated surface 34a of the cylindrical drum 20a. The coating assembly 32a is illustrated as comprising a coating pan 36a and a reverse gravure doctor blade 38a. The coated surface 34a of the cylindrical drum 20a is then engraved by an engraving element 41a, such as a laser 43a. Engraving elements are used to cut or etch letters, patterns, designs, etc. in or on a surface of a material. Engraving elements and methods for engraving materials are well known in the art; thus, no further discussion of the engraving element 41a or engraving methods need be set forth.

Figure 5:
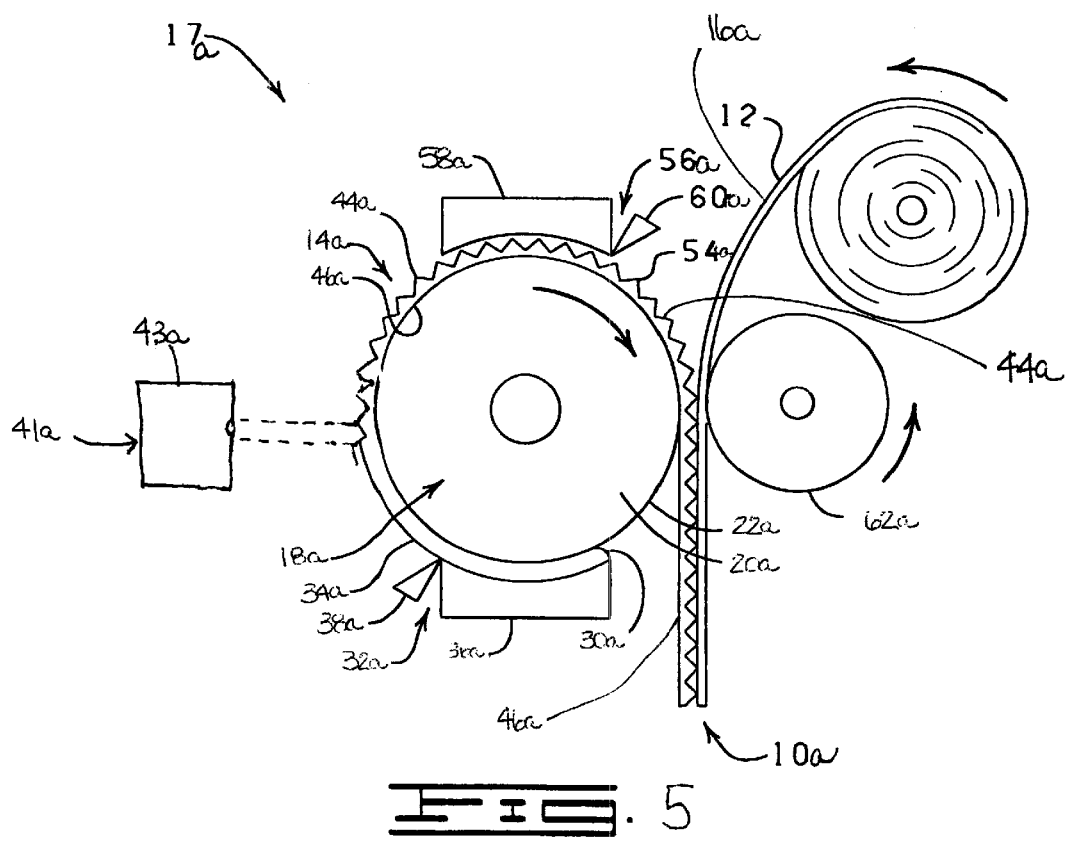
FIG. 5 is a partial schematic representation of an apparatus for producing holographic material in a continuous process, the apparatus utilizing a cylindrical drum and an engraving element.

As shown in FIG. 5, engraving of the coated surface 34a of the cylindrical drum 20a produces a holographic image 14a, which is provided with the first and second surfaces 44a and 46a, respectively, wherein the second surface 46a is substantially adjacent the smooth surface 22a of the cylindrical drum 20a.

Figure 6:
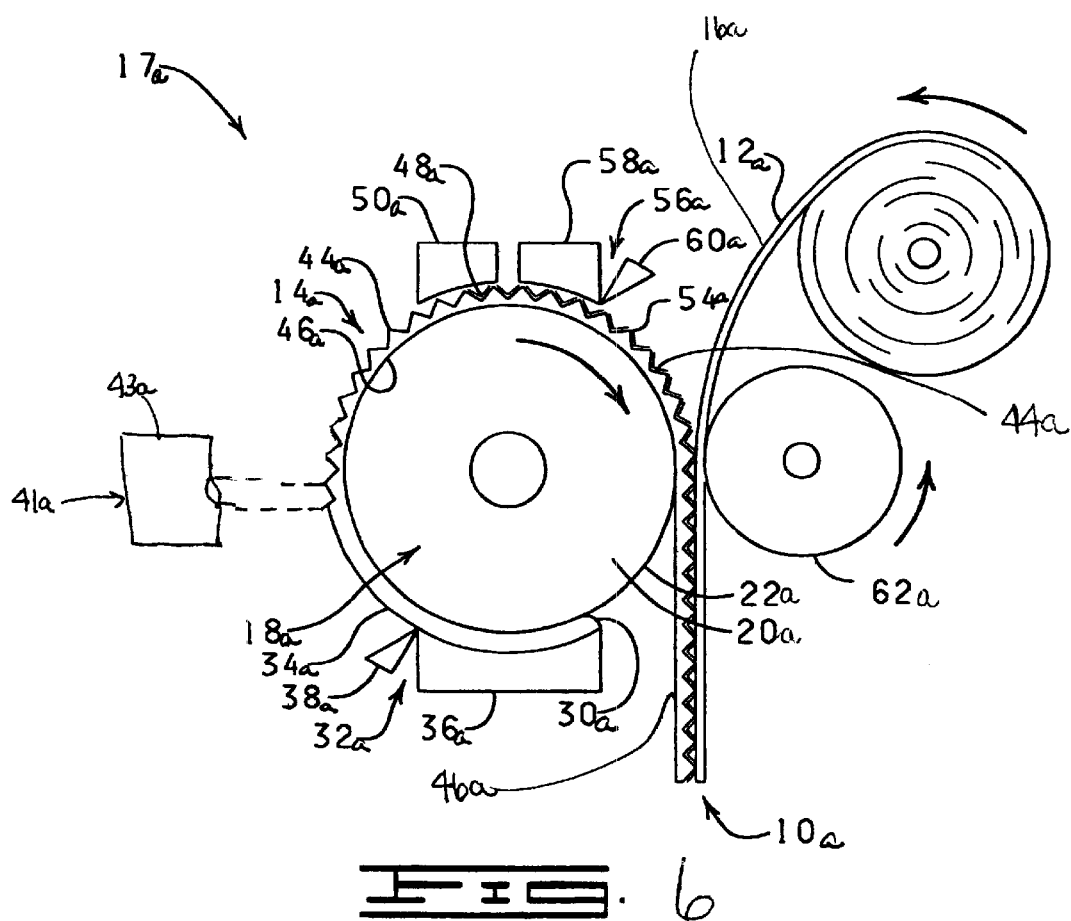
FIG. 6 is a partial schematic representation of another apparatus for producing holographic material in a continuous process, the apparatus utilizing a cylindrical drum and an engraving element.

As shown in FIG. 6, if the coating 30a is formed of a non-metallic material which does not possess reflective properties necessary to provide the holographic image 14a, a metallic constituent or component 48a is applied to the engraved coated surface 34a of the cylindrical drum 20a to provide the holographic image 14a by any suitable method, such as by discharging the metallic constituent or component 48a from a reservoir 50a.

As shown in FIGS. 5 and 6, a bonding material 54a is applied to the first surface 44a of the holographic image 14a by a bonding material applicator 56a comprising a pan 58a and a reverse gravure doctor blade 60a. The bonding material 54a applied to the first surface 44a of the holographic image 14a is contacted with the surface 16a of the substrate 12a, thereby bondingly connecting the holographic image 14a to the substrate 12a and producing the sheet of holographic material 10a.

The holographic image 14a is bondingly secured and transferred to the substrate 12a by any suitable method known in the art. As shown in FIGS. 5 and 6 for example only, a nip is formed by opposing rollers of the cylindrical drum 20a and a sealing drum 62a which sandwiches and effects a seal between the holographic image 14a and the substrate 12a. The holographic material 10a is then removed from the smooth surface 22a of the cylindrical drum 20a by any method known in the art, and the holographic material 10a produced by such processes may be present in different forms, such as a roll or sheets of holographic material 10a.

THE EMBODIMENTS OF FIGS. 7–16

Shown in FIG. 7 is a sheet of holographic material 10b constructed in accordance with the present invention by a batch process which utilizes an apparatus 68b. The sheet of holographic material 10b is similar to the sheet of holographic material 10 described hereinbefore, and comprises a substrate 12b having a surface 16b and having a holographic image 14b formed thereon, the holographic image 14b having a first surface 44b and a second surface 46b. The first surface 44b of the holographic image 14b is bondingly connected to the surface 16b of the substrate 12b. The apparatus 68b for producing the sheet of holographic material 10b in a batch process is illustrated in FIGS. 8–11 and described in detail hereinafter.

The sheet of holographic material 10b is produced using a printing element 70b. The printing element 70b may be provided with a smooth surface or a rough surface. When the printing element 70b is provided with a smooth surface, the need to produce the holographic image on a substrate having a smooth surface, such as required by the prior art methods, is substantially eliminated. The printing element 70b for producing the sheet of holographic material 10b by the batch process utilizing the apparatus 68b may be a plate, a platen press and the like. The printing element 70b may be constructed of any suitable material capable of having the holographic image formed thereon for transfer to a desired substrate. Desirably, the printing element 70b is constructed of a material capable of having a polished, substantially smooth surface; however, it will be understood that the printing element 70b may be provided with a substantially rough surface which is capable of having the holographic image formed thereon. The printing element 70b may be constructed of chrome, stainless steel, tool steel and the like. The printing element 70b may also be constructed in part of a resilient or non-resilient material such that the printing element 70b is provided with a resilient or nonresilient surface.

The printing element 70b of the apparatus 68b utilized in producing the sheet of holographic material 10b in a batch process illustrated in FIG. 8 is a flat plate 72b having a smooth surface 74b. A coating 30b, which is substantially similar to the coating 30 as described hereinbefore, is applied to the smooth surface 74b of the flat plate 72b by a coating assembly 76b, thereby providing a coated surface 78b of the flat plate 72b. The coating assembly 76b is illustrated as a coating brush 80b. However, it should be understood that other methods of applying the coating 30b to the smooth surface 74b of the flat plate 72b may be employed, such as spraying, dipping, and the like.

Figure 9:
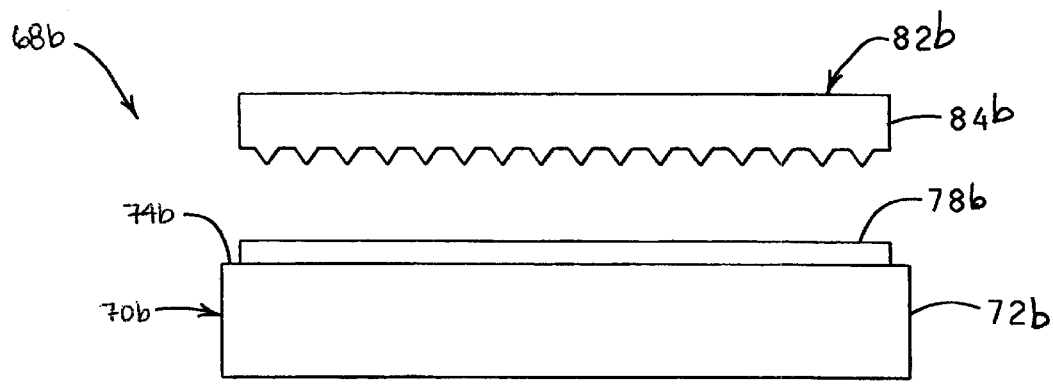
FIG. 9 is a diagrammatic representation of the flat plate with a coated surface of FIG. 8 and an embossing plate for embossing the coated surface of the flat plate to provide an embossed coated surface with a holographic image thereon.

The coated surface 78b of the flat plate 72b is then embossed by an embossing element 82b, such as an embossing plate 84b shown in FIG. 9. Embossing of the coated surface 78b of the flat plate 72b provides a holographic image 14b on the coated surface 78b of the flat plate 72b. The holographic image 14b is provided with a first surface 44b and a second surface 46b which is substantially adjacent the smooth surface 74b of the flat plate 72b.

If the coating 30b used to provide the coated surface 78b of the flat plate 72b is formed of a non-metallic material which does not possess reflective properties necessary to provide the holographic image 14b, a metallic constituent or component (not shown) is applied to the embossed coated surface 78b of the flat plate 72b to provide the holographic image 14b. This process is substantially similar to the metallizing of the embossed coated surface 34 of the cylindrical drum 20 by a metallizing constituent or component 50 to provide the holographic image 10 as illustrated in FIGS. 3 and 5 and described in detail above.

Figure 10:
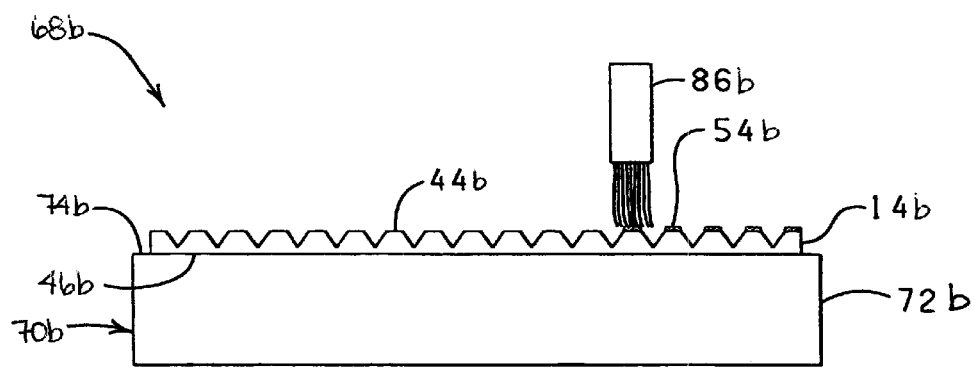
FIG. 10 is a diagrammatic representation of the flat plate of FIG. 9 having an embossed coated surface and a holographic image thereon, the embossed coated surface of the flat plate having an adhesive applied thereto.

Once the holographic image 14b has been produced, a bonding material 54b, which is substantially similar to the bonding material 54 as described hereinbefore, is applied to the holographic image 14b by a bonding material applicator 86b, as shown in FIG. 10. It will be understood that other methods of applying the bonding material 54b to the holographic image 14b on the flat plate 72b may be employed, such as spraying, brushing, etc.

Figure 11:
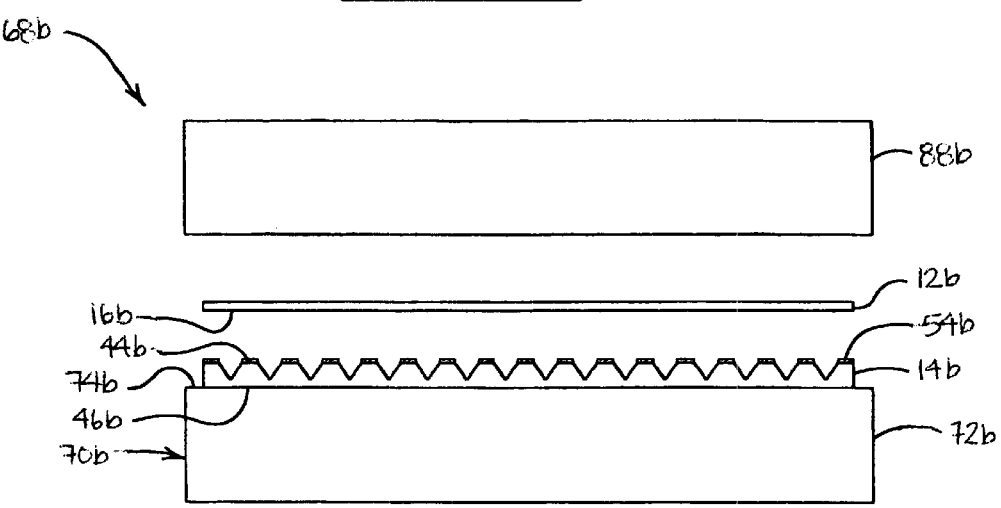
FIG. 11 is a diagrammatic representation of the flat plate of FIG. 10 having an embossed coated surface with a holographic image thereon and an adhesive applied thereto, the adhesive bondingly connecting the embossed coated surface to a substrate to produce a sheet of holographic material constructed from the coating containing a holographic image and the substrate.

The bonding material 54b applied to the holographic image 14b is contacted with the substrate 12b as illustrated in FIG. 11, thereby bondingly connecting the holographic image 14b to the substrate 12b and producing the sheet of holographic material 10b.

To bondingly connect the holographic image 14b to the substrate 12b and to transfer the holographic image 14b from the smooth surface 74b of the flat plate 72b to the substrate 12b, various methods may be employed. For example, heat and/or pressure may be applied to effect the seal between the substrate 12b and the holographic image 14b. As shown in FIG. 11, the holographic image 14b and the substrate 12b may be sandwiched between the flat plate 72b and a sealing plate 88b to effect a seal between the substrate 12b and the holographic image 14b. In addition, the sealing plate 88b may be heated to aid in effecting the seal between the holographic image 14b and the substrate 12b.

It will be understood that other methods of bondingly connecting and sealing the holographic image 14b and the substrate 12b in the batch process 68b for producing the sheet of holographic material 10b as described herein may be employed.

The sheet of holographic material 10b is then removed from the smooth surface 74b of the flat plate 72b. Methods of removing the sheet of holographic material 10b from the flat plate 72b are known in the art. The sheet of holographic material 10b produced by the batch process which utilizes the apparatus 68b may be present in different forms such as a roll or sheets of sheet of holographic material 10b.

Shown in FIG. 12 is a sheet of holographic material 10c which is similar to the sheet of holographic material 10b illustrated in FIG. 7 and described in detail before, except that the holographic image 14c of the sheet of holographic material 10c is produced by engraving rather than embossing. The sheet of holographic material 10c comprises a substrate 12c and a holographic image 14c formed thereon. The sheet of holographic material 10c is produced by a batch process utilizing an apparatus 68c shown in FIGS. 13–16 which is similar to the batch process utilizing the apparatus 68b illustrated in FIGS. 8–11 and described in detail hereinbefore, except that the coated surface 78c of the flat plate 72c is engraved by an engraving element 83c, such as a laser 85c, to produce the holographic image 14c of the sheet of holographic material 10c substantially as shown in FIG. 14, rather than embossed by the embossing element 82b as illustrated in FIG. 9.

The sheet of holographic material 10c is produced using a printing element 70c which is similar to the printing element 70b shown in FIG. 8 and described in detail hereinabove. The printing element 70c of the apparatus 68c utilized in producing the sheet of holographic material 10c in a batch process illustrated in FIG. 13 is a flat plate 72c having a smooth surface 74c. A coating 30c, which is substantially similar to the coating 30 as described hereinbefore, is applied to the smooth surface 74c of the flat plate 72c by a coating assembly 76c, thereby providing a coated surface 78c of the flat plate 72c. The coating assembly 76c is illustrated as a coating brush 80c. However, it should be understood that other methods of applying the coating 30c to the smooth surface 74c of the flat plate 72c may be employed, such as spraying, dipping, and the like.

Figure 14:
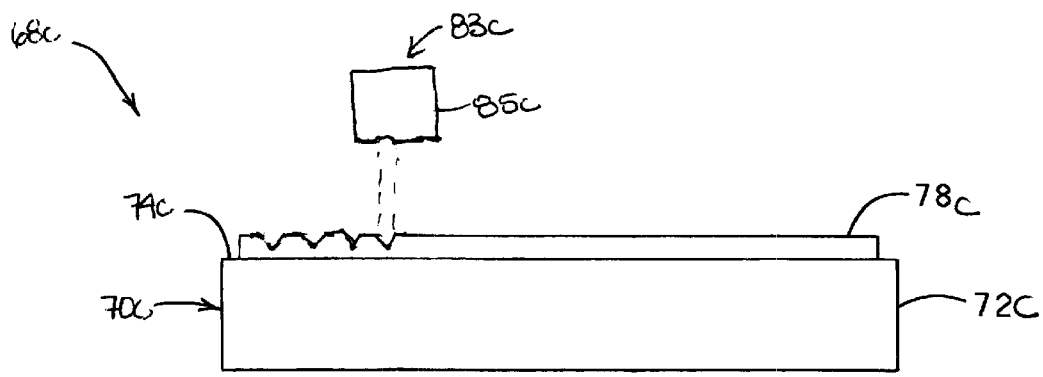
FIG. 14 is a diagrammatic representation of the flat plate with a coated surface of FIG. 13 and an engraving element for engraving the coated surface of the flat plate to provide an engraved coated surface with a holographic image thereon.

The coated surface 78c of the flat plate 72c is then engraved by an engraving element 83c, such as a laser 85c shown in FIG. 14. Engraving of the coated surface 78c of the flat plate 72c provides a holographic image 14c on the coated surface 78c of the flat plate 72c. The holographic image 14c is provided with a first surface 44c and a second surface 46c which is substantially adjacent the smooth surface 74c of the flat plate 72c.

If the coating 30c used to provide the coated surface 78c of the flat plate 72c is formed of a non-metallic material which does not possess reflective properties necessary to provide the holographic image 14c, a metallic constituent or component (not shown) is applied to the engraved coated surface 78c of the flat plate 72c to provide the holographic image 14c. This process is substantially similar to the metallizing of the embossed coated surface 34 of the cylindrical drum 20 by a metallizing constituent or component 50 to provide the holographic image 10 as illustrated in FIGS. 3 and 5 and described in detail above.

Figure 15:
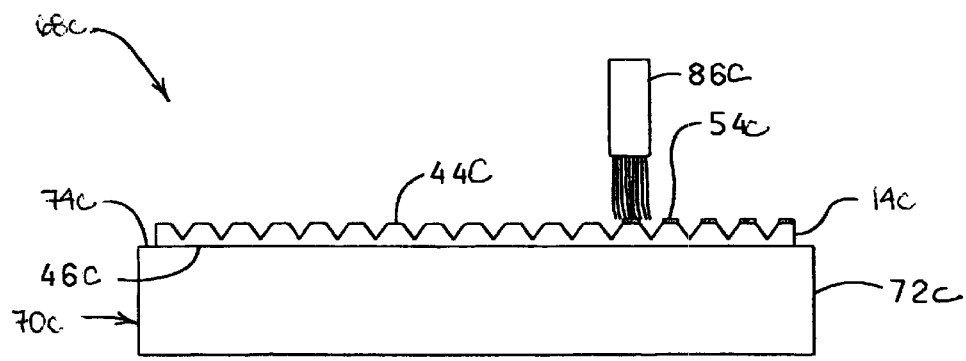
FIG. 15 is a diagrammatic representation of the flat plate of FIG. 14 having an engraved coated surface and a holographic image thereon, the engraved coated surface of the flat plate having an adhesive applied thereto.
Figure 16:
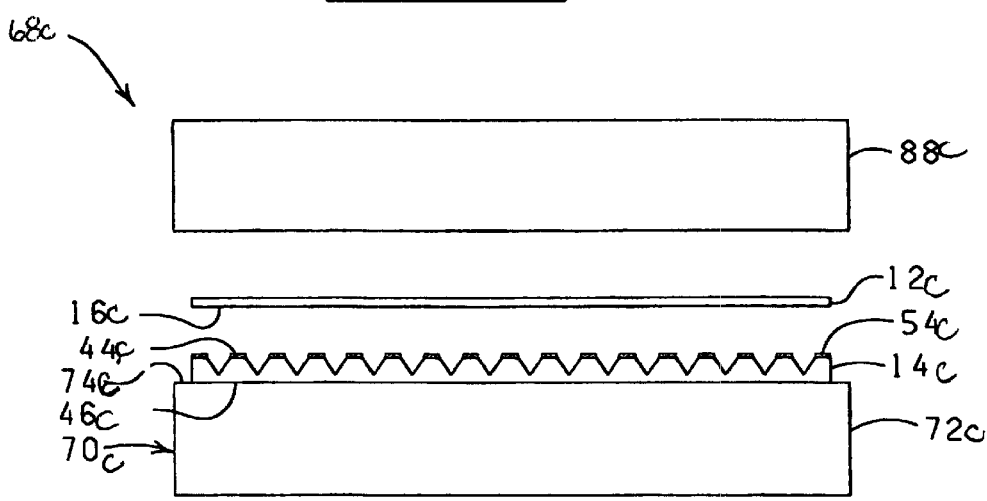
FIG. 16 is a diagrammatic representation of the flat plate of FIG. 15 having an engraved coated surface with a holographic image thereon and an adhesive applied thereto, the adhesive bondingly connecting the engraved coated surface to a substrate to produce a sheet of holographic material constructed from the coating containing a holographic image and the substrate.

Once the holographic image 14c has been produced, a bonding material 54c, which is substantially similar to the bonding material 54 as described hereinbefore, is applied to the holographic image 14c by a bonding material applicator 86c, as shown in FIG. 15. It will be understood that other methods of applying the bonding material 54c to the holographic image 14c on the flat plate 72c may be employed, such as spraying, brushing, etc. The bonding material 54c applied to the holographic image 14c is contacted with the substrate 12c as illustrated in FIG. 16, thereby bondingly connecting the holographic image 14c to the substrate 12c and producing the sheet of holographic material 10c.

To bondingly connect the holographic image 14c to the substrate 12c and to transfer the holographic image 14c from the smooth surface 74c of the flat plate 72c to the substrate 12c, various methods may be employed. For example, heat and/or pressure may be applied to effect the seal between the substrate 12c and the holographic image 14c. As shown in FIG. 16, the holographic image 14c and the substrate 12c may be sandwiched between the flat plate 72c and a sealing plate 88c to effect a seal between the substrate 12c and the holographic image 14c. In addition, the sealing plate 88c may be heated to aid in effecting the seal between the holographic image 14c and the substrate 12c.

It will be understood that other methods of bondingly connecting and sealing the holographic image 14c and the substrate 12c in the batch process which utilizes the apparatus 68c for producing the sheet of holographic material 10c as described herein may be employed.

The sheet of holographic material 10c is then removed from the smooth surface 74c of the flat plate 72c. Methods of removing the sheet of holographic material 10c from the flat plate 72c are known in the art. The sheet of holographic material 10c produced by the batch process which utilizes the apparatus 68c may be present in different forms such as a roll or sheets of sheet of holographic material 10c.

THE EMBODIMENTS OF FIGS. 17–18

Figure 17:
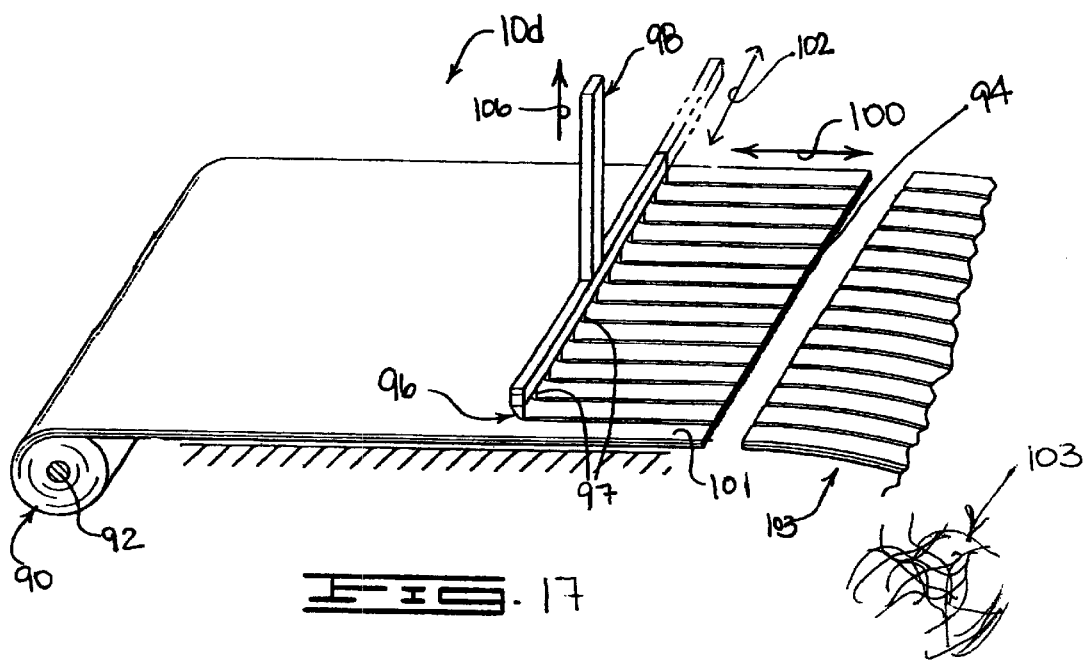
FIG. 17 is a perspective view of a roll of holographic material constructed in accordance with the present invention and illustrating a knife assembly being actuated by an actuator to cut at least a portion of the roll of holographic material into elongated strips of holographic material.
Figure 18:
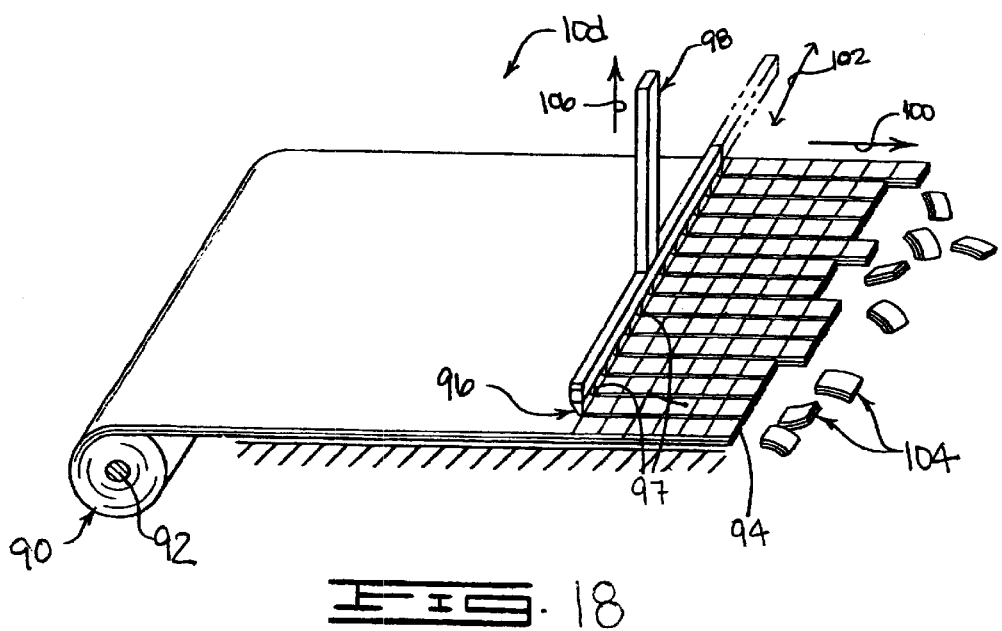
FIG. 18 is a perspective view of the roll of holographic material of FIG. 17, showing the knife assembly being actuated in a second direction, so as to cut the elongated strips of holographic material into segments of holographic material.

Shown in FIGS. 17–18 is a modified holographic material 10d provided as a roll 90 of holographic material 10d. As described in detail herein previously, any of the holographic materials 10 or 10a produced by a continuous process which utilizes the apparatus 17 or 17a or the holographic materials 10b or 10c produced by a batch process which utilizes the apparatus 68b or 68c may be provided as a roll of holographic material. The holographic material 10d may be withdrawn from the roll 90 and severed or disconnected to provide a sheet of holographic material similar to the sheets of holographic material 10, 10a, 10b and 10c hereinbefore described with reference to FIGS. 1, 4, 7 and 12, respectively, or to provide decorative elements such as decorative grass or glitter, as described in detail hereinafter.

The roll 90 of holographic material 10d may be supported on a journally mounted shaft 92, substantially as shown in FIGS. 17 and 18. The holographic material 10d is withdrawn from the roll 90 via a leading edge 94 until a predetermined length of the holographic material 10d has been withdrawn from the roll 90 of holographic material 10d. In this position, a portion of the holographic material 10d is disposed under a knife assembly 96 having a plurality of knife edges 97. The knife assembly 96 is connected to an actuator 98 adapted to move the knife assembly 96 in a first direction 100 and in a second direction 102. When the predetermined length of holographic material 10d has been withdrawn from the roll 90 of holographic material 10d, the actuator 98 moves the knife assembly 96 in the first direction 100 to a position wherein the knife assembly 96 severingly engages the holographic material 10d to shreddingly cut a plurality of elongated strips 101 of the holographic material 10d from the roll 90 of holographic material 10d.

In another optional mode, the actuator 98 may then turn the knife assembly 96 to the second direction 102 wherein the knife assembly 96 severingly re-engages the plurality of elongated strips 101 of holographic material 10d, thereby causing the elongated strips 101 of the holographic material 10d to be severed into segments of decorative grass 103 (FIG. 17) or into small pieces 104 (FIG. 18), for use as glitter, confetti, tinsel, decorative flakes, decals, labels, stickers, sequins, icicles for Christmas trees, imitation snow and the like (it will be appreciated that this process is represented schematically in the drawings). The actuator 98 may comprise a hydraulic or pneumatic cylinder or a motor and gear arrangement or any other form of arrangement suitable for moving the knife assembly 96 in the directions 100 and 102. After the knife assembly 96 has cuttingly severed the desired portion of holographic material 10*d* from the roll 90 of the holographic material 10*d*, the actuator 98 moves the knife assembly 96 in a direction 106 to a storage position disposed a distance above the holographic material 10*d*. Alternatively, the leading edge 94 of the holographic material 10*d* may be run across a first knife assembly 96 set in the surface (not shown) to form the elongated strips 101 of holographic material 10*d*, wherein the actuator 98 actuates a second knife edge (not shown) to cross-cut the elongated strips 101 of holographic material 10*d* into segments of decorative grass 103 or small pieces 104 for use as glitter, confetti, tinsel and the like. Apparatus and methods for making decorative shredded materials and the like are disclosed in U.S. Pat. No. 4,646,388, entitled "APPARATUS FOR PRODUCING WEIGHED CHARGES OF LOOSELY AGGREGATED FILAMENTARY MATERIAL", issued to Weder et al on Mar. 3, 1987, which is hereby expressly incorporated by reference herein. However, it will be understood that while the primary uses of the segments of grass 103 and the small pieces 104 of holographic material 10*d* are for decorative purposes, the segments of grass 103 and small pieces 104 of holographic material 10*d* may also be used for purposes other than decorative purposes, such as but not by way of limitation, uses for scattering light for camouflage or scattering radar beams, as well as for producing sunscreens, pigments, paints, inks and adhesives.

It will be appreciated that the holographic material 10*d* may be a laminate formed by laminating a sheet of material such as a transparent polymeric film to either surface of a holographic material, such as one of the holographic materials 10–10*c* produced as described in detail herein before. The transparent polymeric film of the holographic material 10*d* increases the thickness of the holographic material 10*d* while still maintaining visual display of the holographic image 14*d*, and thus the grass 103 or small pieces 104 of the holographic material 10*d* produced upon cutting the holographic material 10*d* will have a larger volume at substantially less cost than the grass 103 or small pieces 104 produced from the holographic material 10*d* which is not a laminate containing the transparent polymeric film. In addition, barrier properties, heat resistant properties and other desirable properties can be provided to the holographic material 10*d* by lamination of different types of sheets of material to the holographic material to provide the holographic material 10*d*.

EMBODIMENTS OF FIGS. 19–21

As noted previously, the sheet of holographic material 10 may be used to wrap a floral grouping 110. "Floral grouping" as used herein will be understood to include cut fresh flowers, artificial flowers, a single flower, other fresh and/or artificial plants or other floral materials and may include other secondary plants and/or ornamentation or artificial or natural materials which add to the aesthetics of the overall floral arrangement. The floral grouping 110 comprises a bloom or foliage portion 112 and a stem portion 114. The term "floral grouping" may be used interchangeably herein with the term "floral arrangement".

In a method of use, a modified sheet of holographic material 10*e* is provided, which is similar to the sheet of holographic material 10 shown in FIG. 1 and described in detail previously, except as described below. The sheet of holographic material 10*e* has an upper surface 116, a lower surface 118, a first side 120, a second side 122, and third side 124 and a fourth side 126. A strip of bonding material 128 is disposed on the upper surface 116 and near the first side 120 of the sheet of holographic material 10*e*, the strip of bonding material 128 extending between the third and fourth sides 124 and 126, respectively, of the sheet of holographic material 10*e*.

The floral grouping 110 having the bloom portion 112 and the stem portion 114 (FIG. 19) is disposed on the upper surface 116 of the sheet of holographic material 10*e*. The sheet of holographic material 10*e* is then wrapped about the floral grouping 110 by taking the second side 122 of the sheet of holographic material 10*e* and rolling the sheet of holographic material 10*e* in a direction 130 about the floral grouping 110 (FIG. 20). The sheet of holographic material 10*e* is continued to be rolled about the floral grouping 110 until a portion of the bonding material 128 is disposed adjacent a portion of the lower surface 118 of the sheet of holographic material 10*e* and brought into bonding contact or engagement therewith (FIG. 21), thereby bondingly connecting the bonding material 128 on the upper surface 116 of the sheet of holographic material 10*e* to a portion of the lower surface 118 of the sheet of holographic material 10*e* for cooperating to secure the sheet of holographic material 10*e* in a wrapped condition about the floral grouping 110 to provide a wrapper 132 wrapped about the floral grouping 110, as shown in FIG. 21.

In the wrapped condition with the sheet of holographic material 10*e* wrapped about the floral grouping 110 as shown in FIG. 21, the wrapper 132 forms a conical shape with an open upper end 134 and an open lower end 136. The wrapper 132 covers a portion of the bloom portion 112 of the floral grouping 110. A portion of the stem portion 114 of the floral grouping 110 extends through the open lower end 136 of the wrapper 132. The wrapper 132 is tightly wrapped about the stem portion 114 of the floral grouping 110. The bonding material 128 on the sheet of holographic material 10*e* may contact and engage some of the stem portion 114 of the floral grouping 110 to cooperate in securing the wrapper 132 so that the wrapper 132 is tightly wrapped about the stem portion 114 of the floral grouping 110 and to prevent the floral grouping 110 from slipping or moving within the wrapper 132.

At least a portion of the floral grouping 110 is disposed within the wrapper 132. In some applications, the stem portion 114 of the floral grouping 110 extends through the open lower end 136 of the wrapper 132, as described before. In other applications, the stem portion 114 of the floral grouping 110 does not extend through the open lower end 136 of the wrapper 132. In some applications, the wrapper 132 is tightly wrapped about the stem portion 114 of the floral grouping 110. The bloom portion 112 of the floral grouping 110 is disposed adjacent or above the open upper end 134 of the wrapper 132 and the bloom portion 112 of the floral grouping 110 is visible via the open upper end 134 of the wrapper 132. In some instances, the bloom portion 112 of the floral grouping 110 may extend beyond the open upper end 134 of the wrapper 132. In some applications, the upper end 134 of the wrapper 132 may be closed is desired. In some applications, the lower end 136 of the wrapper 132 may be closed if desired.

The wrapper 132, as shown in FIG. 21, is generally conically shaped. The sheet of sheet of holographic material 10*e* may also be wrapped about the floral grouping 110 to form a cylindrically shaped wrapper 132a having an open upper end 134a and an open lower end 136a substantially as shown in FIG. 22, or any other shape wrapper if desired in a particular application.

U.S. Pat. No. 5,181,364, entitled "WRAPPING A FLORAL GROUPING WITH SHEETS HAVING AN ADHESIVE OR COHESIVE MATERIAL APPLIED THERETO", issued to Weder et al on Jan. 26, 1993, which has been incorporated by reference herein above, discloses methods of wrapping a floral grouping in a cylindrically-shaped wrapper.

EMBODIMENTS OF FIGS. 23–28

As noted above, a sheet of holographic material 10f may be used to provide a decorative cover 140 for an object such as a flower pot 142 or a potted plant 144. The term "flower pot" refers to any type of container used for holding a floral grouping or a plant. Examples of flower pots used in accordance with the present invention are clay pots, plastic pots, wooden pots, pots made from natural and/or synthetic fibers, and the like.

The flower pot 142 has an open upper end 146, a closed lower end 148, and an outer peripheral surface 150. An opening 152 intersects the open upper end 146 forming an inner peripheral surface 154 and a retaining space 156. A plant 158 and growing medium 160 (shown in FIG. 28) may be disposed in the flower pot 142, thereby forming the potted plant 144.

To form the sheet of holographic material 10f into the decorative cover 140 about the outer peripheral surface 150 of the flower pot 142, both the flower pot 142 and the sheet of holographic material 10f are provided. The sheet of holographic material 10f is desirably formed of a flexible yet shape-sustaining material. The flower pot 142 is disposed upon the upper surface 116f of the sheet of holographic material 10f so that the closed lower end 148 of the flower pot 142 is disposed substantially adjacent a portion of the upper surface 116f of the sheet of holographic material 10f. To cover the object, the sheet of holographic material 10f may be manually or automatically formed about the outer peripheral surface 150 of the flower pot 142 or potted plant 144.

In one embodiment of a manual application of wrapping the sheet of holographic material 10f about the flower pot 142 to provide the decorative cover 140 for the flower pot 142, the sheet of holographic material 10f is wrapped about the outer peripheral surface 150 of the flower pot 142 so that the upper surface 116f of the sheet of holographic material 10f is disposed substantially adjacent the outer peripheral surface 150 of the flower pot 142 (FIGS. 24 and 25) to form the decorative cover 140 about the flower pot 142 wherein the holographic image 14f of the sheet of holographic material 10f is visible and thereby provides the desired holographic effect to the decorative cover 140 (FIG. 25). That is, the lower surface 118f of the sheet of holographic material 10f becomes an outer surface 164 of the decorative cover 140 and at least a portion of the holographic design 14f constitutes at least a portion of the decor of the decorative cover 140. Methods of manually wrapping a material about a flower pot are known to those having ordinary skill in the art.

The decorative cover 140 comprises a base portion 172 and a skirt portion 174. The base portion 172 of the decorative cover 140 is dimensioned to encompass at least a portion of the outer peripheral surface 150 of the flower pot 142 such that the open upper end 146 of the flower pot 142 remains substantially uncovered by the decorative cover 140, and the skirt portion 174 of the decorative cover 140 extends outwardly from the base portion 172 of the decorative cover 140.

Another method for forming the decorative cover 140 about a flower pot 142 using the sheet of sheet of holographic material 10f is disclosed in U.S. Pat. No. 4,733,521, entitled "COVER FORMING APPARATUS", issued to Weder et al on Mar. 29, 1988, which is hereby expressly incorporated herein by reference.

The decorative cover 140 formed by wrapping the sheet of holographic material 10f about the flower pot 142 may be secured to the outer peripheral surface 150 of the flower pot 142 by the use of one or more bonding materials described herein. A bonding material 161, such as a pressure sensitive adhesive, may be disposed on the upper surface 116f of the sheet of holographic material 10f to secure the decorative cover 140 about the outer peripheral surface 150 of the flower pot 142. In such instance, a portion of the overlapping folds 163 formed in the decorative cover 140 may be connected via the bonding material 161 and a portion of the overlapping folds 163 may remain unconnected.

Alternatively, the sheet of holographic material 10f may be constructed of a shape-sustaining material such that no bonding material is required to form the decorative cover 140. Upon wrapping the shape-sustaining sheet of holographic material 10f about the outer peripheral surface 150 of the flower pot 142 to form the decorative cover 140, the plurality of overlapping folds 163 formed therein are dead folds. The term "dead folds" as used herein is understood to mean the formation of pleats wherein the pleats are unsecured (i.e., not bondingly connected) but maintain their pleated configuration, such as when one folds metal foil.

Another method of securing the decorative cover 140 to the flower pot 142 is by applying a band (not shown) about the decorative cover 140 and the flower pot 142 to hold the decorative cover 140 in place about the flower pot 142 such as is described in U.S. Pat. No. 5,115,599, entitled "MEANS FOR SECURING A DECORATIVE COVER ABOUT A FLOWER POT", issued to Weder on Apr. 21, 1992 and which is hereby expressly incorporated herein by reference.

The term "band" when used herein refers to any material which may be secured about an object such as a flower pot, such bands commonly being referred to as elastic bands, rubber bands or non-elastic bands and also includes any other type of material such as an elastic or non-elastic string, elastic or non-elastic piece of material, a round piece of material, a flat piece of material, a ribbon, a piece of paper strip, a piece of plastic strip, a piece of wire, a tie wrap or a twist tie or combinations thereof or any other device capable of gathering the holographic material to removably or substantially permanently form a crimped portion and secure the crimped portion formed in the holographic material which may be secured about an object such as the flower pot. The band may also include a bow if desired in a particular application.

Figure 28:
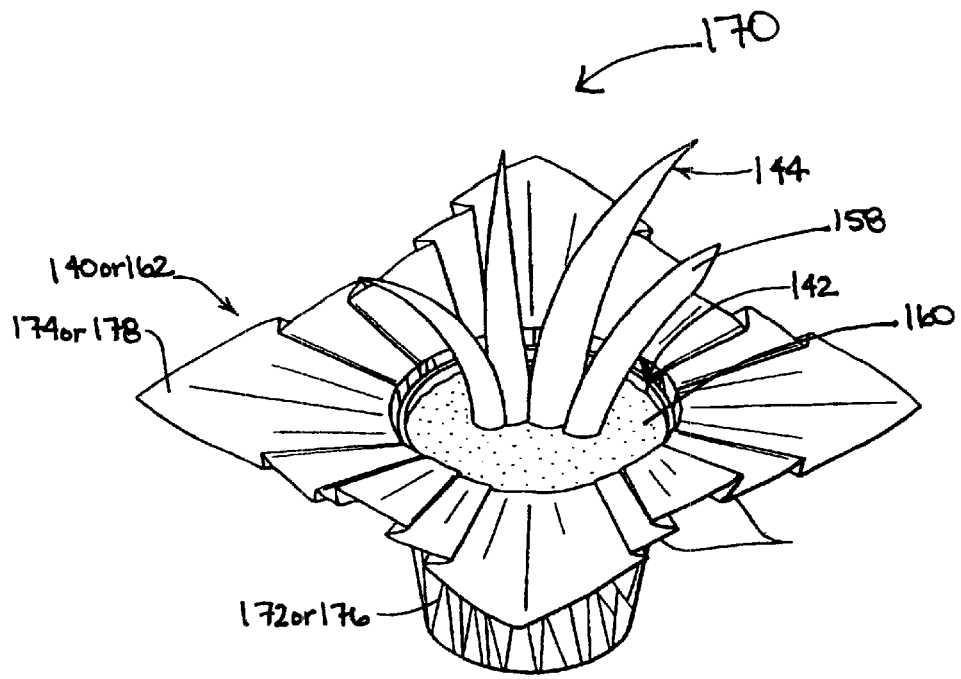
FIG. 28 is a perspective view of a pre-formed decorative pot cover formed from a sheet of holographic material wherein the pre-formed decorative pot cover has a potted plant disposed therein.

Once the decorative cover 140 is constructed by wrapping the sheet of holographic material 10f about a flower pot 142 and the decorative cover 140 is secured to the flower pot 142, growing medium 160 and a plant 158 may be disposed in the flower pot 142 to which the decorative cover 140 is secured, thereby resulting in a decoratively cover potted plant 170 as shown in FIG. 28.

Alternatively, the sheet of holographic material 10f may be formed into a preformed decorative cover 162 (FIG. 26) which is then placed about the outer peripheral surface 150 of the flower pot 142 or potted plant 144. The preformed decorative cover 162 has an opening 166 and comprises a base portion 176 and a skirt portion 178. The base portion 176 of the preformed decorative cover 162 is dimensioned to encompass at least a portion of the outer peripheral surface 150 of the flower pot 142 when the flower pot 142 is disposed in the preformed decorative cover 162. The skirt portion 178 of the preformed decorative cover 162 extends outwardly from the base portion 176 of the preformed decorative cover 140. The preformed decorative cover 162 is self-supporting by virtue of overlapping folds 168 wherein at least a portion of the overlapping folds 168 are bonded together, thereby providing structural integrity to the preformed decorative cover 162. The holographic design 14f of the sheet of holographic material 10f provides at least a portion of the decor of the preformed decorative cover 162.

Figure 26:
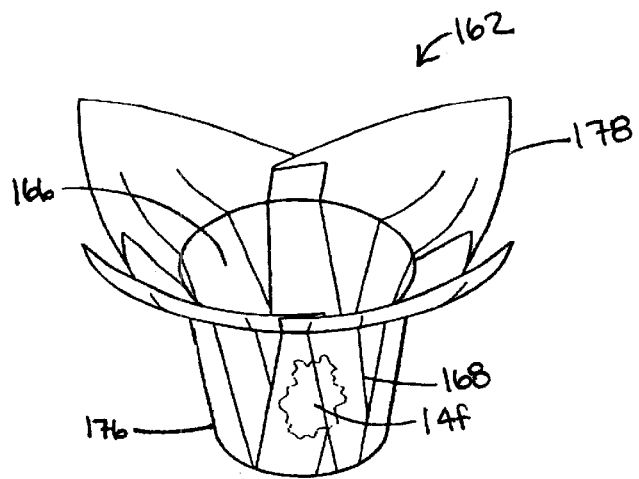
FIG. 26 is a perspective view of a pre-formed decorative pot cover formed from a sheet of holographic material.
Figure 27:
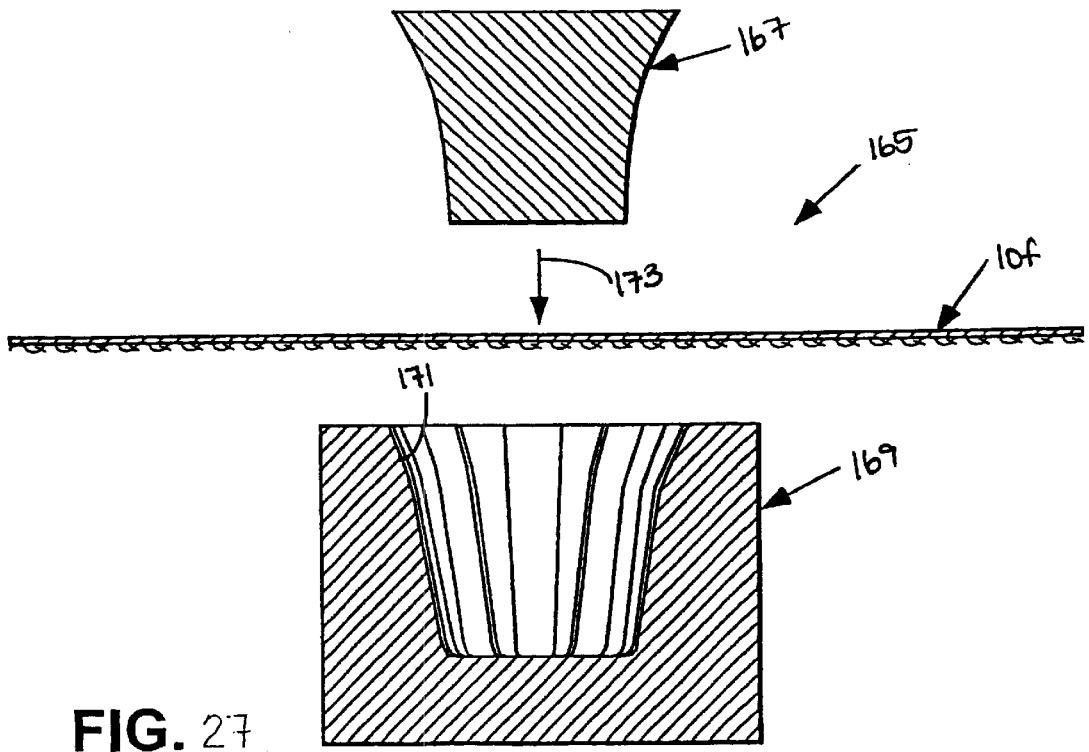
FIG. 27 is a diagrammatic, cross-sectional view of a male and female mold having a sheet of holographic material disposed therebetween for forming the preformed decorative pot cover of FIG. 26.

The preformed decorative cover 162 may be formed using a conventional mold system 165 comprising a male mold 167 and a female mold 169 having a mold cavity 171 for matingly receiving the male mold 167 (FIG. 27). The sheet of holographic material 10f is positioned between the male and female molds 165 and 167, respectively. Movement of the male mold 167 in the direction 173 and into the mold cavity 171 of the female mold 169 forces the sheet of holographic material 10f to be disposed about the portion of the male mold 167 disposed in the mold cavity 171 of the female mold 169 and thereby forms the sheet of holographic material 10f into the preformed decorative cover 162 (FIGS. 26 and 27). The preformed decorative cover 162, which may be constructed from the materials described herein above, may have a bonding material disposed upon a portion thereof.

Methods for forming such preformed decorative pot covers are well known in the art. One method for forming such a preformed plant cover or pot cover is shown in U.S. Pat. No. 4,773,182 entitled "ARTICLE FORMING SYSTEM", issued to Weder et al on Sep. 27, 1988, which is hereby expressly incorporated herein by reference. Another method for forming such covers is described in U.S. Pat. No. 5,291,721 entitled "COVER FORMING APPARATUS HAVING PIVOTING FORMING MEMBERS", issued to Weder et al on Mar. 8, 1994, which is expressly incorporated herein by reference.

A potted plant 144 can be disposed in the opening 166 of the preformed decorative cover 162 such that the open upper end 146 of the flower pot 142 remains substantially uncovered by the preformed decorative cover 162, thereby also resulting in a decoratively covered potted plant 170 as shown in FIG. 28.

The term "potted plant" as used herein refers to a plant having a bloom or foliage portion, a stem portion and a root portion, the root portion being disposed in a growing medium. The term "potted plant" as used herein also includes botanical items and propagules.

The term "botanical item" when used herein refers to a natural or artificial herbaceous or woody plant, taken singly or in combination. The term "botanical item" also refers to any portion or portions of natural or artificial herbaceous or woody plants including stems, leaves, flowers, blossoms, buds, blooms, cones or roots, taken singly or in combination, or in groupings of such portions such as a bouquet or a floral grouping.

The term "propagule" when used herein refers to any structure capable of being propagated or acting as an agent of reproduction including seeds, shoots, stems, runners, tubers, plants, leaves, roots or spores.

The term "growing medium" when used herein refers to any liquid, solid or gaseous material used for plant growth or for the cultivation of propagules, including organic and inorganic materials such as soil, humus, perlite, vermiculite, sand, water, and including the nutrients, fertilizers or hormones or combinations thereof required by the plants or propagules for growth.

EMBODIMENTS OF FIGS. 29–35

Figure 29:
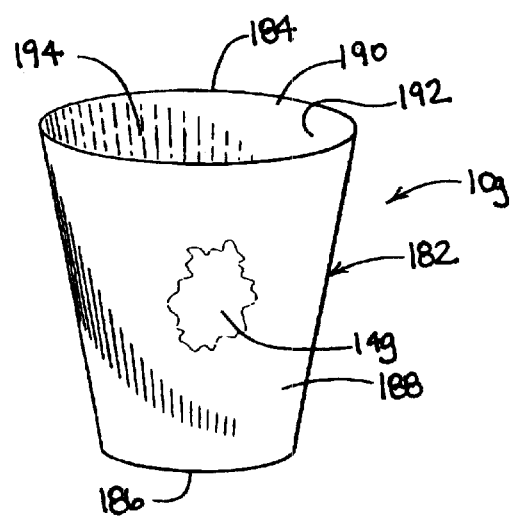
FIG. 29 is a perspective view of a sleeve for wrapping about a floral grouping, wherein the sleeve is constructed from a holographic material in accordance with the present invention.

Shown in FIGS. 29–32 and designated therein by the general reference numeral 180 is a wrapper for a floral grouping 110 constructed from a holographic material 10g which is substantially similar to the holographic material 10 shown in FIG. 1 and described in detail herein previously. The wrapper 180 comprises a sleeve 182, which is generally tubular in shape, and the floral grouping 110. The sleeve 182, as illustrated in FIG. 29, has a first end 184, a second end 186, an outer peripheral surface 188 and an opening 190 intersecting both the first end 184 and the second end 186, forming an inner peripheral surface 192 and providing a retaining space 194 therein. The holographic design 14g of the holographic material 10g is visible on the outer peripheral surface 188 of the sleeve 182. It should be noted that the second end 186 of the sleeve 182 may be closed, forming a closed second end, in which case the opening 190 only intersects the first end 184 of the sleeve 182. Sleeves and their construction are well known in the art, and sleeves are commercially available, as are various devices and mechanisms capable of forming sleeves.

The sleeve 182 is adapted to receive a floral grouping 110 within the retaining space 194 thereof. The floral grouping 110 (FIG. 30) may be disposed in the opening 190 in the sleeve 182 and contained substantially in the retaining space 194 of the sleeve 182, thereby forming the wrapper 180, as will be described in detail below.

Figure 31:
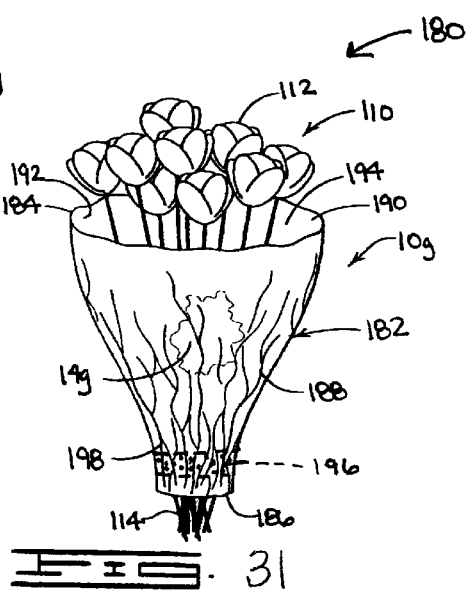
FIG. 31 is a perspective view of a modified wrapper similar to the wrapper of FIG. 30 but having a bonding material disposed on the inner peripheral surface of the sleeve, and showing the wrapper crimped about the stem portion of the floral grouping, the crimped portion forming overlapping folds.
Figure 32:
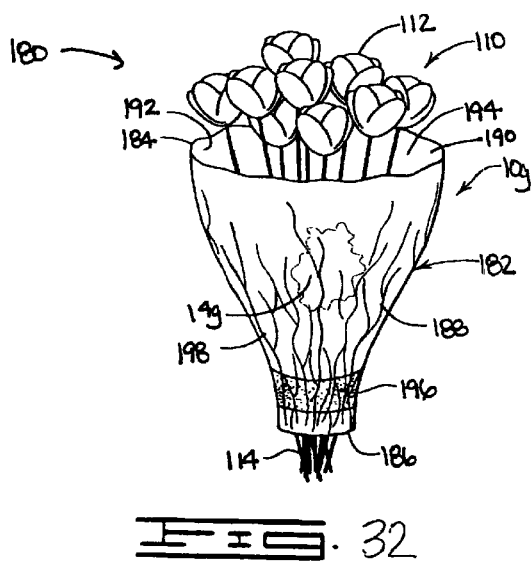
FIG. 32 is a perspective view of a modified wrapper similar to the wrapper of FIG. 30 but having a bonding material disposed on the outer peripheral surface of the sleeve, and showing the wrapper crimped about the stem portion of the floral grouping, the crimped portion forming overlapping folds.

A bonding material 196 may be disposed on at least a portion of the inner peripheral surface 192 of the sleeve 182 (FIG. 31), or alternatively, the bonding material 196 may be disposed on the outer peripheral surface 188 of the sleeve 182 as illustrated in FIG. 32, or in a further alternative, the bonding material 196 may be disposed on both the inner peripheral surface 192 and the outer peripheral surface 188 of the sleeve 182 (not shown).

The bonding material 196 may further comprise a color, or a combination of colors, as previously described herein. Further, the bonding material 196 may comprise at least a portion of a design on the sleeve 182. The term "design" as used herein is defined as any geometric form, or any combination of geometric forms, for example, squares, round spots, triangles, rectangles, octagonals, or the like (not shown). The term "design" is further defined as any non-geometric, asymmetrical or fanciful forms, or any combination thereof, for example, but not by way of limitation, hearts, balloons, flowers, lace, slogans, logos, print (any combination of letters, numbers and/or symbols), signs, human forms (real and fictional), animal forms (real and fictional), cartoon characters, and/or plant forms.

Such a design may comprise a color or a portion of a color or any combination of colors. Alternatively, at least a portion of the design may be colorless, translucent, transparent, opaque, pearlescent, iridescent, or the like.

However, it will be understood that the sleeve 182 may not be provided with a bonding material disposed thereon, and other methods and devices, such as a band, may be employed to secure the sleeve 182 about the floral grouping 110 to form the wrapper 180. Such bands and methods of use thereof have been described in detail hereinbefore.

The sleeve 182 is generally tubularly shaped, but the sleeve 182 may be, by way of example only, cylindrical, conical, frusto-conical, or a combination of both frusto-conical and cylindrical (not shown). Further, as long as the sleeve 182 is capable of receiving a floral grouping 110, any shape of sleeve 182, whether geometric, non-geometric, asymmetrical and/or fanciful, may be utilized.

Figure 30:
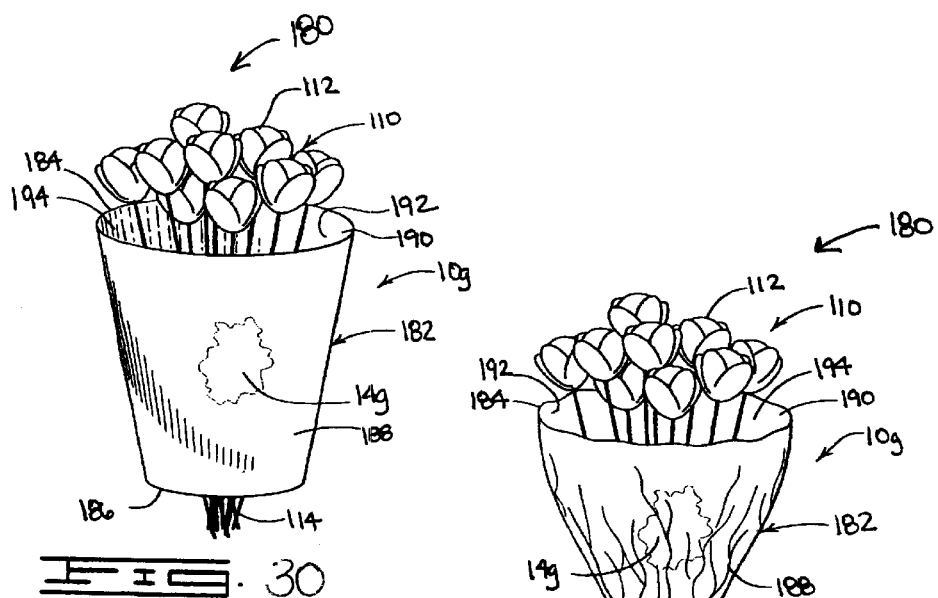
FIG. 30 is a perspective view of a wrapper comprising the sleeve of FIG. 29 and a floral grouping disposed therein, with a bloom portion of the floral grouping disposed adjacent a first end of the sleeve and a stem portion of the floral grouping extending from a second end of the sleeve.

In a general method of use, illustrated in FIGS. 30–32, at least a portion of the floral grouping 110 is disposed within the sleeve 182. In some applications, the stem portion 114 of the floral grouping 110 extends into the sleeve 182 via the open first end 184 of the sleeve 182, extending through and beyond the open second end 186 of the sleeve 182. The bloom portion 112 of the floral grouping 110 is therefore disposed adjacent the open first end 184 of the sleeve 182 and the bloom portion 112 of the floral grouping 110 is visible via the open first end 184 of the sleeve 182 (FIGS. 30–32). In some instances, the bloom portion 114 of the floral grouping 110 may extend above the open first end 184 of the sleeve 182. In some applications, the first end 184 of the sleeve 182 may be closed if desired (not shown). In some circumstances, the second end 186 of the sleeve 182 may be closed if desired (not shown).

In one method of use (FIGS. 30–32), an operator provides the sleeve 182 (FIG. 29), and the floral grouping 110 (FIG. 30). The operator then disposes the floral grouping 110 into the sleeve 182 by opening the sleeve 182 at the first end 184 and disposing the floral grouping 110 into the opening 190 in the sleeve 182 and the retaining space 194 of the sleeve 182 by inserting first the stem portion 114 of the floral grouping 110 into the retaining space 194 of the sleeve 182 via the opening 190 intersecting the first end 184 of the sleeve 182, in a manner which permits a portion of the stem portion 114 of the floral grouping 110 to be disposed in the retaining space 194 adjacent the second end 186 of the sleeve 182, the second end 186 generally having the narrowest diameter. By inserting the floral grouping 110 into the sleeve 182 in this manner, the bloom portion 112 of the floral grouping 110 is also disposed in the retaining space 194 of the sleeve 182 and the bloom portion 112 of the floral grouping 110 is disposed substantially adjacent the first end 184 of the sleeve 182, the first end 184 generally having the widest diameter. In this method, at least a portion of the stem portion 114 of the floral grouping 110 extends slightly beyond the second end 186 of the sleeve 182, and the bloom portion 112 of the floral grouping 110 is clearly visible at the open first end 184 of the sleeve 182.

The sleeve 182 may then be crimped about the floral grouping 110 as shown in FIGS. 31–32. The crimping operation is conducted by an operator after the floral grouping 110 is disposed in the sleeve 182 by crimping at least a portion of the sleeve 182 in the area of the stem portion 114 of the floral grouping 110, wherein the bonding material 196 retains the sleeve 182 in the crimped condition. Such crimping may be conducted by hand, by grasping and substantially encompassing with one or more hands the second end 186 of the sleeve 182 in the area of the bonding material 196 and evenly and firmly squeezing that portion of the sleeve 182 about the area having the bonding material 196, thereby pressing and gathering both the sleeve 182 and the bonding material 196 against itself and about the stem portion 114 of the floral grouping 110. The sleeve 182 may also be crimped by using both a crimping motion (as described above) and a turning motion to create a twisted crimping, resulting in a sleeve 182 which is both crimped as previously described, and which is twisted about at least a portion of the stem portion 114 of the floral grouping 110, the sleeve 182 adjacent the stem portion 114 of the floral grouping 110 being rotated about the stem portion 114 of the floral grouping 110, for example but not by way of limitation, between about one-eighth of a turn to about a full turn (not shown).

When the sleeve 182 is crimped, a plurality of overlapping folds 198 are formed in the crimped area. The plurality of overlapping folds 198 (only one overlapping fold designated by the reference numeral 198 in FIGS. 31 and 32) resulting from the gathered, crimped material of the sleeve 182 may be connected, that is, all of the overlapping portions of the sleeve 182 are bondingly connected together via the bonding material 196. A plurality of overlapping folds 198 may be formed by hand, during crimping, or by mechanical methods and devices. Such mechanical methods and devices are disclosed generally in "ARTICLE FORMING SYSTEM", which has previously been incorporated by reference herein. Alternatively, the crimping may be conducted in a manner in which not all of the plurality of overlapping folds 198 are bondingly connected together. It will be appreciated that the plurality of overlapping folds 198 (connected or unconnected) are formed primarily in the crimped area. Such crimping as described above may also be conducted by any device or mechanism known in the art and used for gathering or crimping materials.

Alternatively, the sleeve 182 may remain uncrimped. The bonding material 196 disposed upon the sleeve 182 may cause the sleeve 182 to bondingly connect to portions of itself, causing the sleeve 182 to conform, either generally or closely (depending, as will be appreciated, upon the amount of bonding material 196 and the amount of holographic material 10g of the sleeve 182 which overlaps and connects to itself) to the floral grouping 110.

When the floral grouping 110 is disposed in the sleeve 182 by any method described herein, or known in the art, the sleeve 182 substantially surrounds and encompasses a substantial portion of the floral grouping 110. When the sleeve 182 is disposed about the floral grouping 110, the sleeve 182 forms a wrapper 180 which provides a decorative packaging for the floral grouping 110 contained therein.

It will be appreciated that the sleeve 182 has sufficient flexibility but also sufficient rigidity to both remain in and sustain its general shape, thereby substantially surrounding and encompassing the floral grouping 110.

Figure 33:
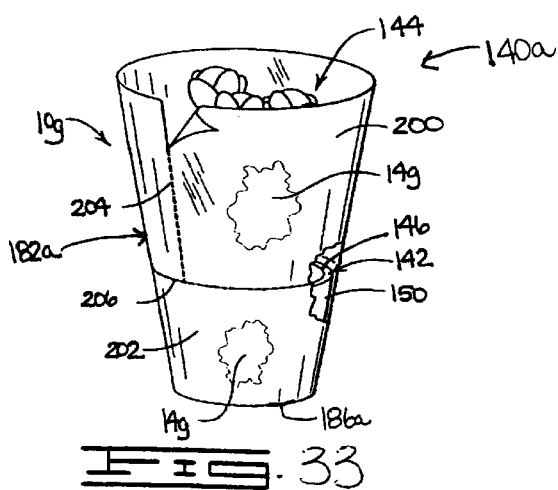
FIG. 33 is a perspective view of a wrapper formed from the holographic material of the present invention wherein the wrapper comprises a flower pot and a sleeve for covering the flower pot wherein the sleeve is provided with vertical and circumferential perforations.
Figure 34:
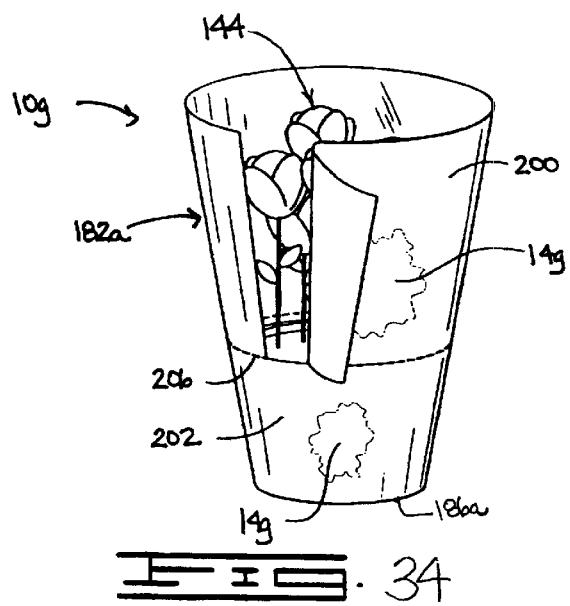
FIG. 34 is a perspective view of the wrapper of FIG. 33 wherein the vertical perforations of the sleeve are torn open and the circumferential perforations of the sleeve are partially torn.
Figure 35:
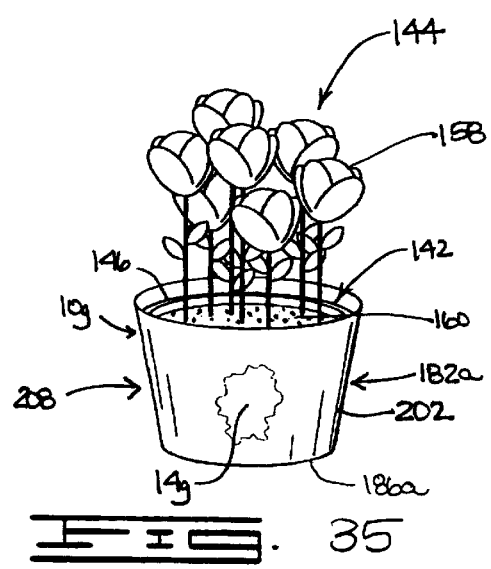
FIG. 35 is a perspective view of the wrapper of FIGS. 33 and 34 wherein an upper portion of the sleeve has been torn away and a remaining lower portion of the sleeve forms a decorative flower pot cover.

Illustrated in FIGS. 33–35 is a decorative cover 140a for a flower pot 142 which is constructed from a sheet of holographic material 10g. The decorative cover 140a is substantially similar in construction to the decorative cover 140 previously described herein with the exceptions hereinafter described. The decorative cover 140a comprises a sleeve 182a, which is substantially similar to the sleeve 182 illustrated in FIG. 29, and may extend over the outer peripheral surface 150 of the flower pot 142. The sleeve 182a includes an upper portion 200 and a lower portion 202. The lower portion 202 of the sleeve 182a is sized to closely surround and encompass a flower pot 142 disposed within the sleeve 182a, while the upper portion 200 of the sleeve 182a extends upwardly from the flower pot 142 disposed in the sleeve 182a. The upper portion 200 of the sleeve 182a is detachable from the lower portion 202 of the sleeve 182a via vertical perforations 204 and/or circumferential perforations 206 which extend about the sleeve 182a adjacent to or above the open upper end 146 of the flower pot 142, as illustrated in FIGS. 33–35, thereby forming a decorative flower pot cover 208 having a holographic image 14g thereon. The holographic design 14g of the holographic material 10g is visible on at least a portion of the lower portion 202 of the sleeve 182a, and the holographic design 14g of the holographic material 10g may be visible on at least a portion of both the upper and lower portions 200 and 202, respectively, of the sleeve 182a.

In one method of use, the flower pot 142 having growing medium 160 and a floral grouping 110 or a plant 158 disposed therein is disposed in the sleeve 182a such that the lower portion 202 of the sleeve 182a is positioned substantially adjacent the outer peripheral surface 150 of the flower pot 142 and the upper portion 200 of the sleeve 182a extends upwardly from the flower pot 142. In this manner, the upper portion 200 of the sleeve 182a substantially surrounds and encompasses at least a portion of the floral grouping 110 or plant 158 disposed in the flower pot 142.

The sleeve 182a may have a bonding material (not shown) disposed thereupon such that the second end 186a of the sleeve 182a can be connected to the flower pot 142. Alternatively, a bonding material may be disposed upon the outer peripheral surface 150 of the flower pot 142. In a further alternative, the bonding material may be disposed on both the flower pot 142 and the sleeve 182a (not shown).

Alternatively, the sleeve 182a may extend over a flower pot 142 already covered by a decorative cover such as the decorative covers 140 or 162 (FIGS. 25 and 26), the sleeve 182a often being torn away from the decorative cover 140 or 162 after shipment and delivery (not shown).

It will be appreciated that the method of disposing the flower pot 142 into the sleeve 182a is generally substantially similar to the method described above for disposing the floral grouping 110 into the sleeve 182.

EMBODIMENT OF FIG. 36

Figure 36:
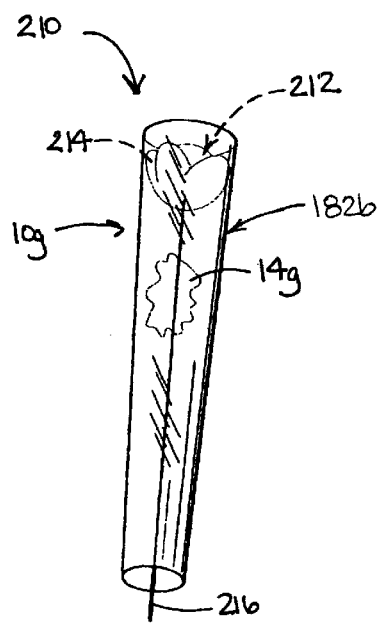
FIG. 36 is a perspective view of a wrapper formed from the holographic material of the present invention wherein the wrapper comprises a sleeve sized to wrap a floral grouping having a single bloom and a single stem and a floral grouping having a single bloom and a single stem.

Shown in FIG. 36 and designated therein by the general reference numeral 210 is a wrapper for a floral grouping 212 comprising a sleeve 182b and a floral grouping 212, the sleeve 182b being constructed from the holographic material 10g and being substantially similar to the sleeve 182 as shown in FIGS. 29–32 and described in detail herein previously. The wrapper 210 is similar to the wrapper 180 above, except that the wrapper 210 is a narrow tubular shape which is constructed to accommodate a floral grouping 212 comprising generally only a single bloom 214 and stem 216. The holographic design 14g of the holographic material 10g is visible on at least a portion of the sleeve 182b, thereby providing the wrapper 210 with a holographic effect.

The method of use of the wrapper 210 is similar to the method of use of the wrapper 180 shown in FIGS. 29–32 and described in detail herein above.

For the sake of brevity, only the use of holographic materials similar to the holographic material 10 for providing decorative covers and wrappers for floral groupings such as cut flowers and potted plants have been described herein. However, it will be understood that holographic materials similar to the holographic materials 10a–10d may be used in the same manner. In addition, while several uses of the holographic materials 10–10d have been disclosed herein, other products which can be produced from the holographic materials of the present invention include sunglasses, sun visors, controlled spectrum lighting, decorative functional boxes and bags, ornaments, window decorations, clothing, signs, highway markings, anti-counterfeiting and copying devices, toys and toy enhancements, heat shielding, radiation shielding, spectrum-modifying glazing and other spectrum-modifying devices, protective coverings for solar cells, insulating material for buildings, refrigerators and freezers, and other insulating needs, greenhouse and terrarium films, UV blocking materials, and photographic and light filters.

From the above description, it is clear that the present invention is well adapted to carry out the objects and to attain the advantages mentioned herein as well as those inherent in the invention. While presently preferred embodiments of the invention have been described for purposes of this disclosure, it will be understood that numerous changes may be made which will readily suggest themselves to those skilled in the art and which are accomplished within the spirit of the invention disclosed and as defined in the appended claims.

What is claimed is:

1. A method for forming a decorative flower pot cover having a holographic image thereon, the method comprising the steps of:

providing a sleeve having a first end, a second end, an outer peripheral surface and a retaining space, the sleeve comprising an upper portion and a lower portion wherein the lower portion of the sleeve is sized to closely surround and encompass a flower pot disposed therein and the upper portion extends upwardly from a flower pot disposed therein, the upper portion of the sleeve being detachable from the lower portion of the sleeve via vertical perforations and circumferential perforations, the sleeve formed of a holographic material wherein the holographic material is produced by a continuous process comprising the steps of:

providing a printing element having a polished, resilient surface, the printing element being selected from the group consisting of a cylindrical drum and a roller;

applying a coating capable of receiving a holographic image to the polished, resilient surface of the printing element to provide a coated surface;

embossing the coated surface to provide a holographic image thereon, the holographic image having a first surface and a second surface wherein the second surface of the holographic image is disposed substantially adjacent the polished, resilient surface of the printing element;

applying a bonding material to the first surface of the holographic image; and disposing a substrate adjacent the first surface of the holographic image containing the bonding material so as to bondingly connect the holographic image to the substrate, thereby producing a holographic material and thus removing the holographic material from the polished, resilient surface of the printing element;

providing a flower pot having an open upper end, a closed lower end, an outer peripheral surface and a retaining space, the flower pot having growing medium and a floral grouping or a plant disposed in the retaining space thereof; and disposing the flower pot within the sleeve, whereby the lower portion of the sleeve is positioned substantially adjacent the outer peripheral surface of the flower pot and the upper portion of the sleeve extends upwardly from the flower pot and substantially surrounds and encompasses the floral grouping or plant disposed in the flower pot, the upper portion of the sleeve being detachable from the lower portion of the sleeve along the vertical and circumferential perforations such that upon detachment of the upper portion of the sleeve, the lower portion of the sleeve remains disposed about the outer peripheral surface of the flower pot and forms a decorative flower pot cover having a holographic image thereon which constitutes at least a portion of the decor of the decorative flower pot cover.

2. A method for forming a decorative flower pot cover having a holographic image thereon, the method comprising the steps of:

providing a sleeve having a first end, a second end, an outer peripheral surface and a retaining space, the sleeve comprising an upper portion and a lower portion wherein the lower portion of the sleeve is sized to closely surround and encompass a flower pot disposed therein and the upper portion extends upwardly from a flower pot disposed therein, the upper portion of the sleeve being detachable from the lower portion of the sleeve via vertical perforations and circumferential perforations, the sleeve formed of a holographic material wherein the holographic material is produced by a continuous process comprising the steps of:

providing a printing element having a polished, resilient surface, the printing element being selected from the group consisting of a cylindrical drum and a roller;

applying a coating capable of receiving a holographic image to the polished, resilient surface of the printing element to provide a coated surface;

embossing the coated surface to provide an image on the coating;

applying a metallic constituent or component to the image to provide a holographic image having a first surface and a second surface wherein the second surface of the holographic image is disposed substantially adjacent the polished, resilient surface of the printing element;

applying a bonding material to the first surface of the holographic image; and disposing a substrate adjacent the first surface of the holographic image containing the bonding material so as to bondingly connect the holographic image to the substrate, thereby producing a holographic material and thus removing the holographic material from the polished, resilient surface of the printing element;

providing a flower pot having an open upper end, a closed lower end, an outer peripheral surface and a retaining space, the flower pot having growing medium and a floral grouping or a plant disposed in the retaining space thereof; and disposing the flower pot within the sleeve, whereby the lower portion of the sleeve is positioned substantially adjacent the outer peripheral surface of the flower pot and the upper portion of the sleeve extends upwardly from the flower pot and substantially surrounds and encompasses the floral grouping or plant disposed in the flower pot, the upper portion of the sleeve being detachable from the lower portion of the sleeve along the vertical and circumferential perforations such that upon detachment of the upper portion of the sleeve, the lower portion of the sleeve remains disposed about the outer peripheral surface of the flower pot and forms a decorative flower pot cover having a holographic image thereon which constitutes at least a portion of the decor of the decorative flower pot cover.

3. A method for forming a decorative flower pot cover having a holographic image thereon, the method comprising the steps of:

providing a sleeve having a first end, a second end, an outer peripheral surface and a retaining space, the sleeve comprising an upper portion and a lower portion wherein the lower portion of the sleeve is sized to closely surround and encompass a flower pot disposed therein and the upper portion extends upwardly from a flower pot disposed therein, the upper portion of the sleeve being detachable from the lower portion of the sleeve via vertical perforations and circumferential perforations, the sleeve formed of a holographic material wherein the holographic material is produced by a continuous process comprising the steps of:

providing a printing element having a polished, resilient surface, the printing element being selected from the group consisting of a cylindrical drum and a roller;

applying a coating capable of receiving a holographic image to the polished, resilient surface of the printing element to provide a coated surface;

engraving the coated surface to provide a holographic image thereon, the holographic image having a first surface and a second surface wherein the second surface of the holographic image is disposed substantially adjacent the polished, resilient surface of the printing element;

applying a bonding material to the first surface of the holographic image; and disposing a substrate adjacent the first surface of the holographic image containing the bonding material so as to bondingly connect the holographic image to the substrate, thereby producing a holographic material and thus removing the holographic material from the polished, resilient surface of the printing element;

providing a flower pot having an open upper end, a closed lower end, an outer peripheral surface and a retaining space, the flower pot having growing medium and a floral grouping or a plant disposed in the retaining space thereof; and disposing the flower pot within the sleeve, whereby the lower portion of the sleeve is positioned substantially adjacent the outer peripheral surface of the flower pot and the upper portion of the sleeve extends upwardly from the flower pot and substantially surrounds and encompasses the floral grouping or plant disposed in the flower pot, the upper portion of the sleeve being detachable from the lower portion of the sleeve along the vertical and circumferential perforations such that upon detachment of the upper portion of the sleeve, the lower portion of the sleeve remains disposed about the outer peripheral surface of the flower pot and forms a decorative flower pot cover having a holographic image thereon which constitutes at least a portion of the decor of the decorative flower pot cover.

4. A method for forming a decorative flower pot cover having a holographic image thereon, the method comprising the steps of:

providing a sleeve having a first end, a second end, an outer peripheral surface and a retaining space, the sleeve comprising an upper portion and a lower portion wherein the lower portion of the sleeve is sized to closely surround and encompass a flower pot disposed therein and the upper portion extends upwardly from a flower pot disposed therein, the upper portion of the sleeve being detachable from the lower portion of the sleeve via vertical perforations and circumferential perforations, the sleeve formed of a holographic material wherein the holographic material is produced by a continuous process comprising the steps of:

providing a printing element having a polished, resilient surface, the printing element being selected from the group consisting of a cylindrical drum and a roller;

applying a coating capable of receiving a holographic image to the polished, resilient surface of the printing element to provide a coated surface;

engraving the coated surface to provide an image on the coating;

applying a metallic constituent or component to the image to provide a holographic image having a first surface and a second surface wherein the second surface of the holographic image is disposed substantially adjacent the polished, resilient surface of the printing element;

applying a bonding material to the first surface of the holographic image; and disposing a substrate adjacent the first surface of the holographic image containing the bonding material so as to bondingly connect the holographic image to the substrate, thereby producing a holographic material and thus removing the holographic material from the polished, resilient surface of the printing element;

providing a flower pot having an open upper end, a closed lower end, an outer peripheral surface and a retaining space, the flower pot having growing medium and a floral grouping or a plant disposed in the retaining space thereof; and disposing the flower pot within the sleeve, whereby the lower portion of the sleeve is positioned substantially adjacent the outer peripheral surface of the flower pot and the upper portion of the sleeve extends upwardly from the flower pot and substantially surrounds and encompasses the floral grouping or plant disposed in the flower pot, the upper portion of the sleeve being detachable from the lower portion of the sleeve along the vertical and circumferential perforations such that upon detachment of the upper portion of the sleeve, the lower portion of the sleeve remains disposed about the outer peripheral surface of the flower pot and forms a decorative flower pot cover having a holographic image thereon which constitutes at least a portion of the decor of the decorative flower pot cover.

* * * * *